United States Patent
Cirio et al.

(10) Patent No.: US 11,250,187 B2
(45) Date of Patent: *Feb. 15, 2022

(54) COMPUTER IMPLEMENTED METHOD, SYSTEM AND COMPUTER PROGRAM PRODUCT FOR SIMULATING THE BEHAVIOR OF A WOVEN FABRIC AT YARN LEVEL

(71) Applicant: UNIVERSIDAD REY JUAN CARLOS, Madrid (ES)

(72) Inventors: Gabriel Cirio, New York, NY (US); Miguel Angel Otaduy Tristan, Madrid (ES); David Miraut Andres, Madrid (ES); Jorge Lopez Moreno, Madrid (ES)

(73) Assignee: SEDDI, INC., New York, NY (US)

(*) Notice: Subject to any disclaimer, the term of this patent is extended or adjusted under 35 U.S.C. 154(b) by 83 days.

This patent is subject to a terminal disclaimer.

(21) Appl. No.: 16/689,376

(22) Filed: Nov. 20, 2019

(65) Prior Publication Data

US 2020/0125777 A1 Apr. 23, 2020

Related U.S. Application Data

(63) Continuation of application No. 15/525,899, filed as application No. PCT/ES2015/070804 on Nov. 10, 2015, now Pat. No. 10,528,683.

(30) Foreign Application Priority Data

Nov. 18, 2014 (ES) .................. ES201431693

(51) Int. Cl.
*G06F 30/20* (2020.01)
*G06F 17/12* (2006.01)
(Continued)

(52) U.S. Cl.
CPC .............. *G06F 30/20* (2020.01); *G06F 17/12* (2013.01); *G06F 2113/12* (2020.01); *G06T 15/04* (2013.01); *G06T 2210/16* (2013.01)

(58) Field of Classification Search
CPC ...... G06F 30/20; G06F 17/12; G06F 2113/12; G06F 30/00; G06T 15/04; G06T 2210/16
See application file for complete search history.

(56) References Cited

PUBLICATIONS

M. Grujicic, et al., "Fiber-Level Modeling of Dynamic Strength of KEVLAR KM2 Ballistic Fabric," ASM International Journal of Materials Engineering and Performance, pp. 1107-1119 (Year: 2012).*
(Continued)

*Primary Examiner* — Steven W Crabb
(74) *Attorney, Agent, or Firm* — Marton Ribera Schumann & Chang LLP; Chien-Ju Alice Chuang; Hector J. Ribera

(57) ABSTRACT

Computer implemented method, system and computer program product for simulating the behavior of a woven fabric at yarn level. The method comprises.
retrieving the layout of warp yarns (1), weft yarns (2) and yarn crossing nodes (3):
describing each yarn crossing node (3) by a 3D position coordinate (x) and two sliding coordinates, warp sliding coordinate (u) and weft sliding coordinate (v) representing the sliding of warp (1) and weft (2) yarns;
measuring forces on each yarn crossing node (3) based on a force model, the forces being measured on both the 3D position coordinate (x) and the sliding coordinates (u, v);
calculating the movement of each yarn crossing node (3) using equations of motion derived using the Lagrange-Euler equations, and numerically integrated over time, wherein the equations of motion account for the mass density distributed uniformly along yarns, as well as the measured forces and boundary conditions.

28 Claims, 14 Drawing Sheets

(51) Int. Cl.
G06F 113/12 (2020.01)
G06T 15/04 (2011.01)

(56) References Cited

PUBLICATIONS

V.B.C. Tan et al., "Modelling crimp in woven fabrics subjected to ballistic impact," International Journal of Impact Engineering 32, pp. 561-574 (Year: 2005).*
Shi Min et al., "Physically-based Method for Cloth Deformation", Workshop on Digital Media and Digital Content Management, IEEE DOI 10.1109/DMDCM.2011.34, pp. 176-180 (Year: 2011).*
X. S. Zeng et al., "Modelling inter-yarn friction in woven fabric armour", Int. J. Numer. Meth. Engn. vol. 66, No. 8, pp. 1309-1330 (Year: 2006).*
Jiahua Zhang et al., "IDSS: A Novel Representation for Woven Fabrics," IEEE Transactions on Visualization and Computer Graphics, vol. 19, No. 3, p. 420-432 (Year: 2013).*

* cited by examiner

| Example | Seg. length (mm) | Yarn radius (mm) | Elastic mod. (Pa) | Bending mod. (Pa) | Contact Shear mod. (Pa) | Sliding Fric. Coef. | α, β |
|---|---|---|---|---|---|---|---|
| Tank top (Fig. 6) | 1 | 0.25 | 1e7 | 1e-2 | 1e4 | 0.3 | 10, 0.05 |
| Long shirt (Fig. 8) | 1 | 0.25 | 1e7 | 2e-2 | 1e4 | 0.3 | 20, 0.05 |
| 1M nodes sheet (Fig. 11) | 0.254 | 0.06 | 1e7 | 1e-2 | 3e5 | 0.3 | 35, 0.01 |

Fig. 6

| Example | Collisions | Forces | Jacobians | Solver |
|---|---|---|---|---|
| Tank top | 322 | 28 | 280 | 2513 |
| Long shirt | 519 | 34 | 365 | 4033 |
| 1M nodes sheet | 803 | 35 | 385 | 930 |

Fig. 7

COMPUTER IMPLEMENTED METHOD,SYSTEM AND COMPUTER PROGRAM PRODUCT FOR SIMULATING THE BEHAVIOR OF A WOVEN FABRIC AT YARN LEVEL

CROSS-REFERENCE TO RELATED APPLICATIONS

The present application is a continuation of U.S. patent application Ser. No. 15/525,899 titled "Computerized Method, Computer Program Product and System for Simulating the Behavior of a Woven Textile Interwoven at Thread Level," filed on May 10, 2017, which was a national phase entry under 35 U.S.C. § 371 of International Patent Application No. PCT/ES2015/070804 titled "Computerized Method, Computer Program Product and System for Simulating the Behavior of a Woven Textile Interwoven at Thread Level," filed on Nov. 10, 2015, published in English, which claims priority to Spanish Patent Application No. P201431693 titled, "Computerized Method, Computer Program Product and System for Simulating the Behavior of a Woven Textile Interwoven at Thread Level," filed on Nov. 18, 2014, all of which are incorporated by herein by reference in their entirety.

FIELD OF THE INVENTION

The present invention is composed within the field of simulations of the behavior of woven cloth at a yarn-level.

BACKGROUND OF THE INVENTION

Woven cloth is formed by interlacing yarns, typically two sets of orthogonal yarns called warp and weft. Interlaced yarns undergo friction forces at yarn-yarn contacts, and this friction holds together the woven fabric, in contrast to Knitted fabrics, which are held together by stitching yarns. Woven cloth is ubiquitous, and it exhibits diverse weave patterns and yarn materials, both stiff and elastic Common woven fabrics include chiffon, corduroy, denim, flannel, gabardine, sheeting, or velvet.

Large-scale mechanics of woven cloth are dictated by the fine-scale behavior of yarns, their mechanical properties, arrangement, and contact interactions. However, popular cloth models, with the notable exception of the work of Kaldor et al. [2008; 2010], do not model yarn-level mechanics. They use either discrete elements, as in the case of mass-spring systems [Breen et al. 1994; Provot 1995], or discretizations of continuum formulations, as in the case of finite-element models [Etzmuss et al. 2003].

Such discretized models are often sufficient for capturing relevant behavior of woven cloth, in particular draping under moderate forces But yarn-level models introduce exciting possibilities for computer animation. Visually interesting effects such as detailed tearing, snags, or loose yarn ends require modeling individual yarns. Moreover, yarn-based models can constitute the cornerstone to develop accurate solutions to large-scale cloth simulation, revealing the nonlinearities and complex interplays measured in real fabrics [Wang et al. 2011 Miguel et al. 2012; Miguel et al. 2013].

Computational cost has been the key challenge to address yarn-level cloth simulation Capturing the mechanics of individual yarns requires the use of rod models [Pai 2002; Spillmann and Teschner 2009, Bergou et al. 2008; Casadi and Bertails-Descoubes 2013], and weave patterns produce a number of contacts that is quadratic in the number of yarns. Modeling even low yarn-density fabrics soon leads to an explosion in the number of degrees of freedom (DoFs) and contacts, and common fabrics may contain in the order of 100 yarns/inch.

Most cloth simulation models in computer graphics consider cloth as a thin shell and formulate an elastic deformation model to capture its mechanics [Terzopoulos et al. 1987]. Then, cloth modeling faces the challenge of defining deformation energies and discretizations that are numerically robust and match the behavior of real cloth Some key milestones in cloth modeling in computer graphics include: mass-spring models that approximate the behavior of real woven fabrics [Breen et al. 1994], the addition of strain limiting to model inextensibiliy [Provot 1995], efficient handling of self-collisions [Volino et al. 1995], definition of deformation energies from constraints with efficient time integration [Baraff and Witkin 1998], robust models to handle buckling [Choi and Ko 2002], consistent bending models [Bridson et al. 2003; Grinspun et al. 2003], efficient inextensibility [Goldenthai et al. 2007], and efficient dynamic remeshing [Narain et at. 2012].

Recent work in computer animation has also aimed to match the nonlinear behavior in real cloth. Relevant works include the design of nonlinear parametric models [Volino et al. 2009], estimation of material coefficients from force and deformation examples [Wang et al. 2011; Miguel et al. 2012], and design of internal friction models to capture cloth hysteresis [Miguel et al. 2013]

In contrast to popular thin shell models. Kaldor et al. [2008] modeled the dynamics of knitted cloth at the yarn level, allowing them to predict the large-scale behavior of full garments from fundamental yarn mechanics. They captured the mechanics of individual yarns using an inextensible rod model, and yarn-yarn contact with a combination of stiff penalty forces and velocity-filler friction. Later in [2010], they extended their work to accelerate yarn-yarn contact handling, by using local rotated linearizations of penalty forces. However, the present invention proposes a more efficient solution for the case of woven cloth that avoids altogether handling yarn-yarn contact at yarn crossings. Metaaphanon et al. [2009]proposed a yarn-level model for woven cloth. They modeled yarn-yarn interaction by setting constraints between the end points of warp and weft springs. In addition, they designed an automatic transition from a mass-spring model to the yarn-level model.

Yarn-level models have been thoroughly studied in the field of textile research. Yarn-based analytical models [Hearle et al. 1969] were used to predict the mechanical behavior of fabric under specific modes of deformation, usually based on geometric yarn models. These analytical models, such as Peirce's parametric circular cross-section yarns [Peirce 1937] or Kawabata's much simpler pin-joined trusses [Kawabata et al. 1973], model yarns at crossover points assuming persistent contact and accounting for crimp separation. However, as for most analytical models these approaches are limited to the specific cases they were designed for, and developing an analytical framework for general load cases would be extremely complex [King et al. 2005], let alone entire garments.

Mesostructure-based continuum models emerged to simulate larger fabric samples [Boisse et al. 1997; Parsons et al. 2010]. These models approximate woven fabric as a continuum, where every material point represents a section of yarns. Each section is then simulated using a greatly simplified analytic unit cell employing, for instance. Kawabata's pin-joined truss model.

Another family of models attempts to simulate the full fabric at yarn level using finite element discretizations of volumetric yarns, accounting for all yarn interactions [Ng et al. 1998; Page and Wang 2000; Duan et al. 2006]. However, the large computational requirements make them intractable for moderately large samples. Greater computational efficiency was achieved by replacing the complex volumetric yarns by simpler elements such as beams, trusses and membranes [Reese 2003; McGlockton et al. 2003]. Another interesting approach is to resort to costly yarn-level mechanics only when needed, using multiscale models that couple continuum and yarn-level descriptions [Nadler et al. 2006].

Somewhat hybrid techniques rely on mesostructure-based continuum approaches, but using a discrete model for unit cells. These cells allow axial compliance and can be augmented with bending and crossover springs to simulate cross-sectional deformation and shear at crossover points [King et al. 2005; Xia and Nadler 2011]. Shear jamming is achieved by introducing truss elements normal to the yarns to simulate contact forces between the yarns [King et al. 2005]. However, since yarns are pinned together at crossover points, these unit-cell approaches prevent yarn sliding. Parsons and collaborators [2013] address yarn sliding by introducing a slip velocity field at the continuum level, with forces computed at meso-level using the unit cell. Slippage friction forces are proportional to the normal forces at the crossover points. However, these approaches usually do not simulate every yarn in the fabric, thus preventing interesting single yarn effects such as snags, frayed edges, yarn fracture and yarn pullouts. In addition, typical yarn-level models in textile research assume persistent contact between woven yarns, but they do not resolve yarn positions under free garment motions, only controlled experiments. By contrast, the approach of the present invention allows to simulate every yarn in the fabric as a rod, while greatly reducing costly contact interactions by making contact persistent and introducing additional sliding degrees of freedom.

An essential aspect of yarn-level simulation is the choice of rod model to capture the mechanics of individual yarns. Pai [2002] developed an efficient algorithm to simulate rods modeled following Cosserat theory. Spillmann and Teschner [2007] improved on Cosserat models to handle contact efficiently, and later in [2009] they extended them to handle branched and looped structures. Bergou et al. [2008] presented an approach for rod simulation that decouples centerline dynamics from a quasi-static solution of twist based on parallel transport. Casati and Bertais-Descoubes [2013] have recently evolved clothoid-based models to efficiently resolve the dynamics of rich and smooth rods with very few control points.

As outlined before, the major challenge in modeling cloth at the yarn level is efficient contact handling between yarns. Sueda et al. [2011] presents a model suited for simulating efficiently highly constrained rods. The key insight of their model is to describe the kinematics of constrained rods using an optimal set of generalized coordinates, formed by so-called Lagrengian coordinates that capture absolute motion, and so-called Eulerian coordinates that capture sliding on constraint manifolds. This approach fits for representing constrained yarns in woven cloth, so that a discretization for a case not handled by Suede et al., consisting of two rods in sliding contact, has now been designed.

REFERENCES

BARAFF. D., AND WITKIN, A. 1998. Large steps in cloth simulation. In Proceedings of ACM SIGGRAPH 98, 4354.

BELL. N., AND GARLAND, M., 2012. Cusp; Generic parallel algorithms for sparse matrix and graph computations. Version 0.3.0.

BERGOU. M., WARDETZKY, M., ROBINSON, S., AUDOLY, B., AND GRINSPUN, E, 2008. Discrete elastic rods. ACM Trans. Graph, 27, 3, 63:163:12.

BERTHOUZOZ, F., GARG, A., KAUFMAN, D. M., GRINSPUN, E., AND AGRAWALA, M. 2013. Parsing sewing patterns into 3D garments. ACM Trans. Graph. 32, 4, 85:1-85:12.

BOISSE. P., BORR, M., BUET, K., AND CHEROUAT, A. 1997. Finite element simulations of textile composite forming including the biaxial fabric behaviour. Composites Part B. Engineering 28, 4, 453-464.

BREEN. D. E., HOUSE. D H., AND WOZNY, M. J. 1994. Predicting the drape of woven cloth using interacting particles. In Proceedings of ACM SIGGRAPH 94, 365-372.

BRIDSON. R., MARINO. S., AND FEDKIW, R. 2003. Simulation of clothing with folds and wrinkles. In Proceedings of ACM SIGGRAPH/Eurographics Symposium on Computer animation 2003, 2836.

CASATI, R., AND BERTAILS-DESCOUBES, F. 2013. Super space clothoids. ACM Trans. Graph. 32, 4, 48. CHEN, Y., LIN, S., ZHONG, H., XU, Y.-Q., GUO, B., AND SHUM. H.-Y. 2003. Realistic rendering and animation of knitwear IEEE Transactions on Visualization and Computer Graphics 9.1 (Jan.), 43-55.

CHOI. K-J., AND KO. H.-S. 2002. Stable but responsive cloth. ACM Trans. Graph. 21, 3, 604-611.

DAVIET, G., BERTAILS-DESCOUBES, F., AND BOISSIEUX, L. 2011. A hybrid iterative solver for robustly capturing coulomb friction in hair dynamics. ACM Trans. Graph 30, 6, 139:1-139:12.

DE JOYA, J.M., NARAIN, R., O'BRIEN, J., SAMII, A., AND ZORDAN, V. Berkeley garment library. http.//graphics.berkeley.edu/resources/GarmentLibrary/.

DUAN. Y., KEEFE, M., BOGETTI, T. A., AND POWERS, B. 2006. Finite element modeling of transverse impact on a ballistic fabric, International Journal of Mechanical Sciences 48, 1, 33-43.

ETZMUSS, O., KECKEISEN, M., AND STRASSER, W. 2003. A fast finite element solution for cloth modelling. In Proceedings of Pacific Graphics 2003, 244-251.

GOLDENTHAL, R., HARMON, D., FATTAL, R., BERCOVIER, M., AND GRINSPUN, E. 2007. Efficient simulation of inextensible cloth. ACM Trans, Graph, 26, 3, 49.

GOLDSTEIN, H., POOLE, C. P., AND SAFKO, J. L. 2001. Classical Mechanics (3rd Edition), 3 ed. Addison-Wesley.

GRINSPUN, E., HIRANI, A. N., DESBRUN, M., AND SCHR'O DER, P, 2003. Discrete shells. In Proceedings of ACM SIGGRAPH/Eurographics Symposium on Computer animation 2003, 6267.

HARMON, D., VOUGA, E., SMITH, B., TAMSTORF, R., AND GRINSPUN, E. 2009. Asynchronous contact mechanics. ACM Trans. Graph. 28, 3, 97.

HEARLE, J. W. S., GROSBERG P., AND BACKER, S. 1969, Structural Mechanics of Fibers. Yarns, and Fabrics, vol. 1. JohnWiley & Sons Inc, New York.

JAKOB, W., 2010. Mitsuba renderer. http://www.mitsubarenderer.org.

KALDOR, J. M., JAMES, D. L., AND MARSCHNER, S. 2008. Simulating knitted cloth at the yarn level. ACM Trans. Graph. 27, 3, 65:165:9.

KALDOR, J. M., JAMES, D. L., AND MARSCHNER, S. 2010. Efficient yarn-based cloth with adaptive contact linearization, ACM Trans. Graph. 29, 4, 105:1-105:10.

KAWABATA, S., NIWA, M., AND KAWAI, H. 1973. The finitedeformation theory of plain-weave fabrics part i: The blaxialdeformation theory. Journal of the Textile Institute 64, 1, 21-46.

KAWABATA, S. 1980. 'The Standardization and Analysis of Hand Evaluation' Textile Machinery Society of Japan, 1980.

KING, M. J., JEARANAISILAWONG, P., AND SOCRATE, S. 2005. A continuum constitutive model for the mechanical behavior of woven fabrics. International Journal of Solids and Structures 42, 13, 3867-3896.

LOPEZ-MORENO, J., CIRIO, G., MIRAUT, D., AND OTADUY, M. A. 2014. GPU Visualization and Voxelization of Yarn-Level Cloth. Proceedings of the Spanish Computer Graphics Conference.

MCGLOCKTON, M. A., COX, B. N., AND MCMEEKING, R. M. 2003. A binary model of textile composites; III high failure strain and work of fracture in 3D weaves. Journal of the Mechanics and Physics of Solids 51, 8, 1573-1600.

METAAPHANON, N., BANDO, Y., CHEN, B.-Y., AND NISHITA, T. 2009. Simulation of tearing cloth with frayed edges. Comput. Graph. Forum 7, 1837-184.

MIGUEL, E., BRADLEY, D., THOMASZEWSKI, B., BICKEL, B., MATUSIK, W., OTADUY, M. A., AND MARSCHNER, S. 2012. Data-driven estimation of cloth simulation models. Comp. Graph. Forum 31, 510-62 .

MIGUEL E., TAMSTORF, R., BRADLEY, D., SCHVARTZMAN, S. C., THOMASZEWSKI, B., BICKEL, B., MATUSIK, W., MARSCHNER, S., AND OTADUY, M. A. 2013, Modeling and estimation of internal friction in cloth, ACM Trans. Graph. 32, 6, 212:1-212:10.

NADLER, B., PAPADOPOULOS, P., AND STEIGMANN, D. J. 2006. Multiscale constitutive modeling and numerical simulation of fabric material. International Journal of Solids and Structures 43, 2, 206-221.

NARAIN, R., SAMII, A., AND O'BRIEN, J. F. 2012. Adaptive anisotropic remeshing for cloth simulation. ACM Trans. Graph. 31, 6, 152:1-152:10.

NG, S.-P., TSE, P.-C., AND LAU, K.-J. 1998. Numerical and experimental determination of in-plane elastic properties of 2/2 twill weave fabric composites. Composites Part B: Engineering 29, 6, 735-744.

O'BRIEN, J. F., AND HODGINS, J. K. 1999. Graphical modeling and animation of brittle fracture. In Proceedings of ACM SIGGRAPH 99, 137146.

PAGE, J., AND WANG. J. 2000. Prediction of shear force and an analysis of yarn slippage for a plain-weave carbon fabric in a bias extension state. Composites Science and Technology 60, 7, 977-986.

PAI, D. K. 2002. Strands: Interactive simulation of thin solids using cosserat models. Comput. Graph. Forum 21, 3, 347-352.

PARSONS, E. M., WEERASOORIYA, T., SARVA, S., AND SOCRATE, S. 2010. Impact of woven fabric: Experiments and mesostructure-based continuum-level simulations. Journal of the Mechanics and Physics of Solids 58, 11, 1995-2021.

PARSONS, E. M., KING, M. J., AND SOCRATE, S. 2013. Modeling yarn slip in woven fabric at the continuum level; Simulations of ballistic impact. Journal of the Mechanics and Physics of Solids 61, 1, 265-292.

PEIRCE, F. T. 1937. The geometry of cloth structure. Journal of the Textile Institute Transactions 28, 3, T45-T96.

PFAFF. T., NARAIN. R., DE JOYA, J. M., AND O'BRIEN, J. F. 2014. Adaptive tearing and cracking of thin sheets. ACM Trans. Graph. 33, 4, 110:1-9.

PROVOT, X. 1995. Deformation constraints in a massspring model to describe rigid cloth behavior. In In Graphics Interface, 147-154.

REESE, S. 2003. Anisotropic elastoplastic material behavior in fabric structures. In IUTAM Sympossum on Computational Mechanics of Solid Materials at Large Strains, 201-210.

SPILLMANN, J., AND TESCHNER, M. 2007. CoRdE: cosserat rod elements for the dynamic simulation of one-dimensional elastic objects. In Proceedings of ACM SIGGRAPH/Eurographics Symposium on Computer Animation 2007, 6372.

SPILLMANN, J., AND TESCHNER, M. 2009. Cosserat nets. IEEE Transactions on Visualization and Computer Graphics 15, 2, 325-338.

SUEDA. S., JONES, G. L., LEVIN, D. I. W., AND PAI, D. K. 2011. Large-scale dynamic simulation of highly constrained strands. ACM Trans. Graph. 30, 4, 39:1-10.

SULLIVAN, J. M. 2008. Curves of finite total curvature. In Discrete Differential Geometry, A. I. Babenko, J. M. Sullivan, P. Schroder, and G. M. Ziegler, Eds., vol. 38 of Oberwolfach Seminars Birkhauser. Basel. 137-161.

TANG, M., TONG, R., NARAIN, R., MENG, C., AND MANOCHA, D. 2013. A GPU-based streaming algorithm for high-resolution cloth simulation. Computer Graphics Forum 32. 7, 21-30.

TERZOPOULOS, D., PLATT, J., BARR, A., AND FLEISCHER, K. 1987. Elastically deformable models. In Proceedings of ACM SIGGRAPH 87, 205-214.

TESCHNER, M., HEIDELBERGER, B., MUELLER, M., POMERANETS, D., AND GROSS, M. 2003. Optimized spatial hashing for collision detection of deformable objects. 47-54.

VOLINO, P., COURCHESNE, M., AND MAGNENAT THALMANN, N. 1935. Versatile and efficient techniques for simulating cloth and other deformable objects. In Proceedings of ACM SIGGRAPH 95, 137-144.

VOLINO, P., MAGNENAT-THALMANN, N., AND FAURE, F. 2009. A simple approach to nonlinear tensile stiffness for accurate cloth simulation. ACM Trans. Graph. 28. 4, 105:1-105:18.

WANG, H., O'BRIEN, J. F., AND RAMAMOORTHI, R. 2011. Data-driven elastic models for cloth modeling and measurement. ACM Trans. Graph. 30, 4, 71:1-71:12.

XIA, W., AND NADLER, B. 2011. Three-scale modeling and numerical simulations of fabric materials. International Journal of Engineering Science 49, 3, 229-239.

YAMANE, K., AND NAKAMURA, Y. 2006. Stable penalty-based model of frictional contacts. In Proceedings of IEEE International Conference on Robotics and Automation 2006, 1904-1909.

Description of the Invention

The large-scale mechanical behavior of woven cloth is determined by the mechanical properties of the yarns, the weave pattern, and frictional contact between yarns. Using standard simulation methods for elastic rod models and yarn-yarn contact handling, the simulation of woven garments at realistic yarn densities is deemed intractable. The present invention introduces an efficient solution for simulating woven cloth at the yarn level, using a novel discretization of interlaced yarns based on yarn crossings and yarn sliding, which allows modeling yarn-yarn contact implicitly, avoiding contact handling at yarn crossings altogether. Combined with models for internal yarn forces and inter-yarn frictional contact, as well as a massively parallel solver, the present invention is able to simulate garments with hundreds of thousands of yarn crossings at practical frame-rates on a desktop machine, showing combinations of large-scale and fine-scale effects induced by yarn-level mechanics.

A first aspect of the present invention refers to a computer implemented method for simulating the behavior of a woven fabric at yarn level. The method comprises:
  retrieving structural information of a woven fabric, said structural information at least including the layout of warp yarns, weft yarns and yarn crossing nodes of the woven fabric;
  applying boundary conditions at a plurality of time steps;
  describing each yarn crossing node of the woven fabric by a 3D position coordinate and two sliding coordinates, warp sliding coordinate (u) and weft sliding coordinate respectively representing the sliding of warp and weft yarns;
  measuring forces on each yarn crossing node based on a force model, the forces being measured on both the 3D position coordinate and the sliding coordinates of yarn crossing nodes;
  calculating the movement of each yarn crossing node at a plurality of time steps using equations of motion derived using the Lagrange-Euler equations, and numerically integrated over time, wherein the equations of motion account for the mass density distributed uniformly along yarns, as well as the measured forces and boundary conditions.

The boundary conditions are established as external forces at yarn crossing nodes, or as the motion of an object or person that interacts with the woven fabric, where the forces between the object/person and the fabric are measured at the yarn crossing nodes in contact.

The layout of warp yarns, weft yarns and yarn crossing nodes of the woven fabric includes the directions of the yarns and their density. The inter-yarn distance can be directly obtained from the layout of the yarns.

The structural information of the woven fabric further may include any of the following information:
  a 2D pattern of the woven fabric, including panels and seam locations;
  the layout of warp yarns, weft yarns and yarn crossing nodes for each panel;
  the weave pattern of the woven fabric for each panel;
  yarn densities and widths for all the different yarn types used in the woven fabric;
  mechanical parameters for all the different yarn types used in the woven fabric, said mechanical parameters including at least any of the following:
    the elastic modulus,
    the bending modulus,
    the shear contact modulus,
    the sliding friction coefficient,
    damping-to-mass ratio,
    damping-to-elasticity ratio, The retrieved structural information of the woven fabric preferably includes the sliding friction coefficient of the yarns, and the force model includes sliding friction forces by using the sliding friction coefficient and the sliding coordinates.

In a preferred embodiment the retrieved structural information of the woven fabric includes the stiffness of the yarns, and the force model includes contact between adjacent parallel yarns by using the sliding coordinates, the stiffness of the yarns and the inter-yarn distance obtained from the layout of the yarns.

In yet a preferred embodiment the retrieved structural information of the woven fabric includes the elastic modulus of the yarns, and the force model includes stretch forces. The retrieved structural information of the woven fabric may also include the bending modulus of the yarns, the force model including bending forces. The force model may also use inter-yarn normal compression at yarn crossings using the normal components of stretch and bending forces.

The retrieved structural information of the woven fabric preferably includes the shear contact modulus of the yarns, and the force model includes shear forces.

A further aspect of the present invention refers to a system for simulating the behavior of a woven fabric at yarn level, the system comprising: p1 data storing means for storing structural information of a woven fabric, said structural information at least including the layout of warp yarns, weft yarns and yarn crossing nodes of the woven fabric; and
  data processing means configured for:
    retrieving said structural information,
    applying boundary conditions at a plurality of time steps,
    describing each yarn crossing node of the woven fabric by a 3D position coordinate and two sliding coordinates, warp sliding coordinate and weft sliding coordinate respectively representing the sliding of warp and weft yarns:
    measuring forces on each yarn crossing node based on a force model, the forces being measured on both the 3D position coordinate and the sliding coordinates of yarn crossing nodes;
    calculating the movement of each yarn crossing node at a plurality of time steps using equations of motion derived using the Lagrange-Euler equations, and numerically integrated over time, wherein the equations of motion account for the mass density distributed uniformly along yarns, as well as the measured forces and boundary conditions.

A further aspect of the present invention refers to a computer program product for simulating the behavior of a woven fabric at yarn level. The computer program product comprises computer usable program code for performing the steps of the computer implemented method previously defined. The computer program product is preferably stored in a program support means, such as a CD, a DVD, a memory stick or a hard drive.

The key aspect of the method of simulation of woven cloth at yarn-level is a discretization focused on yarn crossings, consisting of the 3D position of the crossing point plus two additional degrees of freedom to capture yarn sliding, following the Eulerian rod discretization of Suede et al. [2011]. Inter-yarn contact is handled implicitly, and it is avoided altogether the computation of collision detection and collision response between crossing yarns.

Based on the proposed discretization, force models for low level yarn mechanics are formulated. These include stretch and bending forces of individual yarns. But, most importantly, the novel discretization enables simple formulations of inter-yarn contact forces, in particular sliding friction at yarn crossings and contact between adjacent parallel yarns. Interesting effects, such as plasticity at yarn level or the influence of the weave pattern on large-scale behavior are obtained naturally thanks to yarn-level mechanics.

To robustly simulate yarn-level clothing, implicit integration to the dynamics equations is applied. A massively parallel solver that leverages the weave pattern, as well as a novel discretization, has been designed. With the GPU implementation, clothing with over 300K nodes and 2K yarns can be simulated at just over 2 min/frame (where one frame is ¹⁄₂₄th of a second) on a desktop machine.

The prediction of garment draping takes as input the following parameters:

A 2D layout of the garment patterns, indicating which parts of the pattern boundaries constitute seams. A 2D pattern of a woven fabric includes the layout of the fabric panels and how these panels are sewed (seam locations).

The directions of warp and weft yarns on the 2D patterns.

Yarn densities in both warp and weft directions.

The weave pattern, i.e. plain weave, twill, satin, etc. The weave pattern indicates at each yarn crossing which yarn, warp or weft, is on top.

Yarn widths for all the different yarn types used in the garment.

Mechanical parameters for all the different yarn types used in the garment.

These parameters include:

Elastic modulus.

Bending modulus.

Shear contact modulus.

Sliding friction coefficient.

Damping-to-mass ratio and damping-to-elasticity ratio.

The mechanical parameters can be obtained by performing stretch, shear and bending Kawabata tests [Kawabata 1980], and then fitting parameter values to the measured force-deformation curves.

The present invention achieves efficient yarn-level simulations of woven cloth, with high resolution and short computational time, predicting the mechanical and visual behavior of any kind of woven cloth. The invention replaces continuum models, models based on finite element discretizations of volumetric yarns and yarn-level models that represent warp and weft yarns separately, solving the contact between them. The present invention predicts in a robust, realistic and efficient way, the behavior of a whole cloth starting from the behavior of individual yarns.

The invention provides the following advantages in the textile sector.

Reduced costs, increased productivity and greater flexibility in the design and innovation of textile fabrics. Performance of new fabrics can be evaluated on simulated prototypes.

Performing textile analysis to evaluate wrong design of products.

Conducting high quality animations of new garments for marketing purposes.

The invention may be applied on different sectors.

Textile fabric design.

Fashion and clothing design.

Commercialization of clothing.

Automotive Sector: Textile upholstery items.

Medicine: woven fabrics for manufacturing stents, etc.

BRIEF DESCRIPTION OF THE DRAWINGS

A series of drawings which aid in better understanding the invention and which are expressly related with an embodiment of said invention, presented as a non-limiting example thereof, are very briefly described below;

FIG. 6 shows a table with parameter values used in the examples.

FIG. 7 shows a table with average cost per time step (in milliseconds) for the examples, broken down by step.

FIG. 11A shows a snag formed by pulling two yarns while blocking the outward motion of the cloth. FIG. 11B represents real snagging under similar conditions. FIG. 11C shows a close-up of the snag of FIG. 11A.

DESCRIPTION OF A PREFERRED EMBODIMENT OF THE INVENTION

First, it will be described how to construct cloth models based on yarns. Next, it will be presented the key feature of our yarn-based cloth model: the discretization of yarn kinematics based on the positions of yarn crossing points and yarn sliding. Finally, the formulation of the equations of motion based on this discretization will be outlined.

To construct garments at the yarn level, a tailoring approach is followed. The 2D pattern that forms a garment is taken as input, laying warp and weft yarns as orthogonal straight lines on each 2D panel independently, at an inter-yarn distance L. At each seam an additional yarn is placed, and weft and warp yarns are connected to seam yarns by sharing nodes. At cloth boundaries it may be chosen between adding seam yarns or letting yarn endings hang freely. 3D cloth models can be obtained automatically from commercial patterns [Berthouzoz et al. 2013], hence the present modeling process can also be easily automated.

Figure 1A:
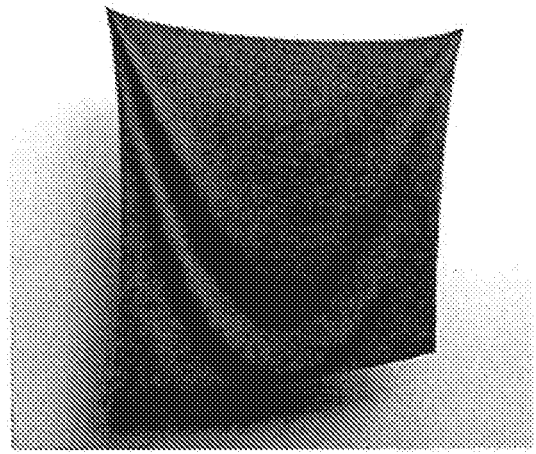
FIGS. 1A, 1B and 1C show different weave patterns with increasing floats: plain, twill, and satin.
Figure 1B:
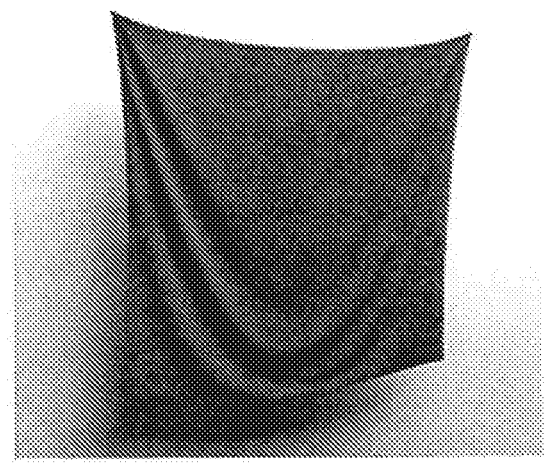
Figure 1C:
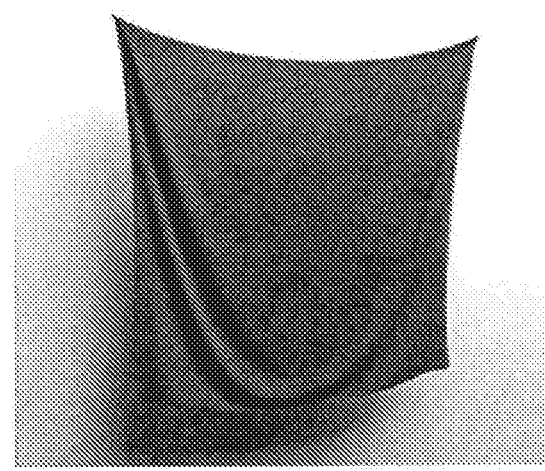

A float constitutes a gap between two yarns of the same type where the other yarn is not interlaced. Different weave patterns, such as plain weave (with no floats), twill, satin, etc. are obtained by varying the distribution of floats, thereby affecting the mechanics of the resulting fabric. FIGS. 1A, 1B and 1C show, respectively, different weave patterns with increasing floats; plain weave pattern (FIG. 1A), twill pattern (FIG. 1B) and satin pattern (FIG. 1C). More floats lead to lower shear resistance, hence cloth falls lower when pinned from two corners.

Figure 2:
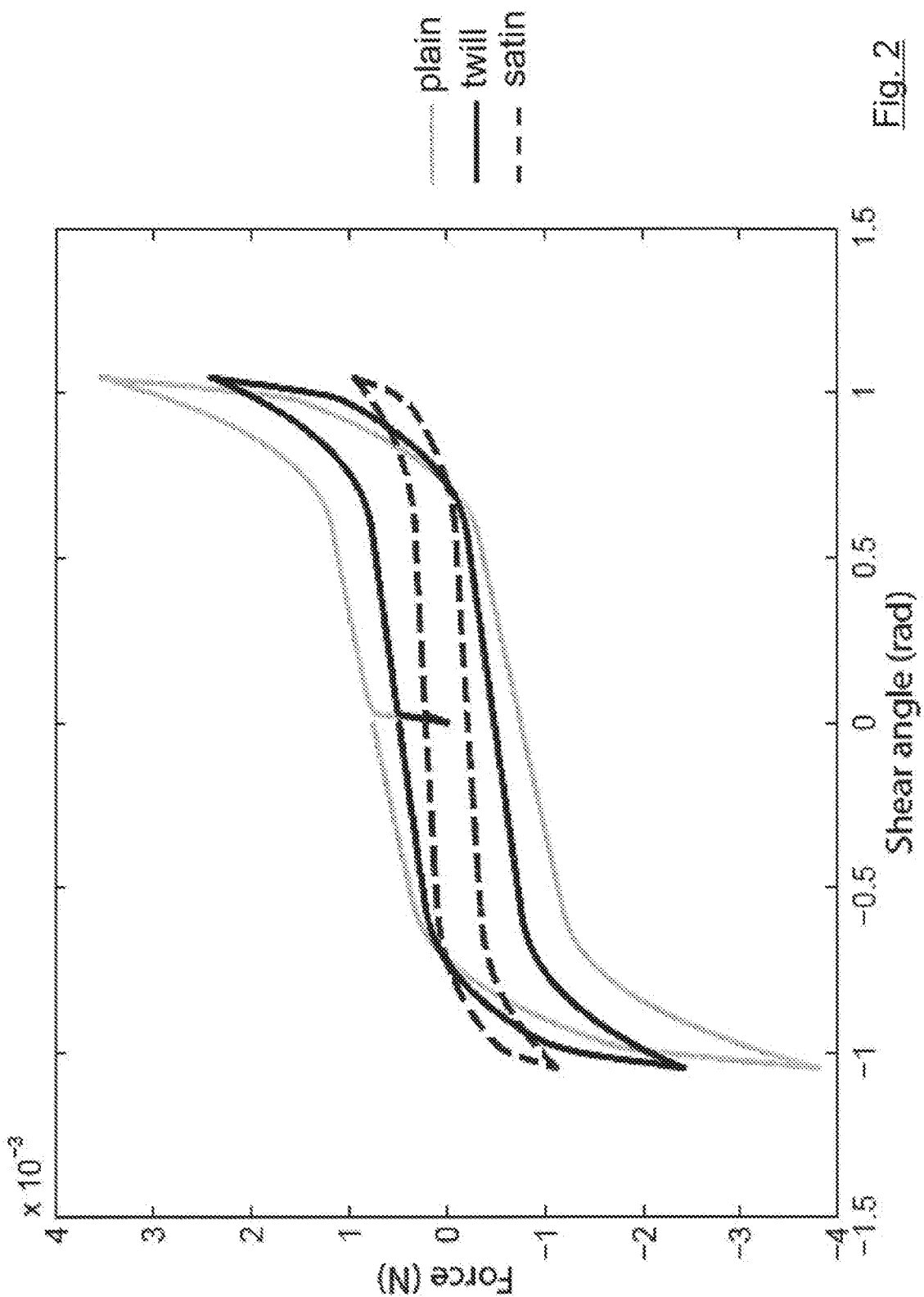
FIG. 2 represents a graph relating the force with respect to shear angle for the three hanging sheet examples of FIG. 1.

To model the weave pattern, an arbitrary orientation for each panel is chosen, storing at each yarn crossing a flag indicating which yarn, warp or weft, is on top. This simple strategy allows modelling plain weave, twill, satin, and all other common weaves. FIG. 2 represents a graph relating the force (in N) with respect to shear angle (in radians) for the three hanging sheet examples of FIGS. 1A, 1B and 1C. Shear force, friction and jamming are clearly visible, as well as the different behaviors according to the weave pattern.

Figure 3A:
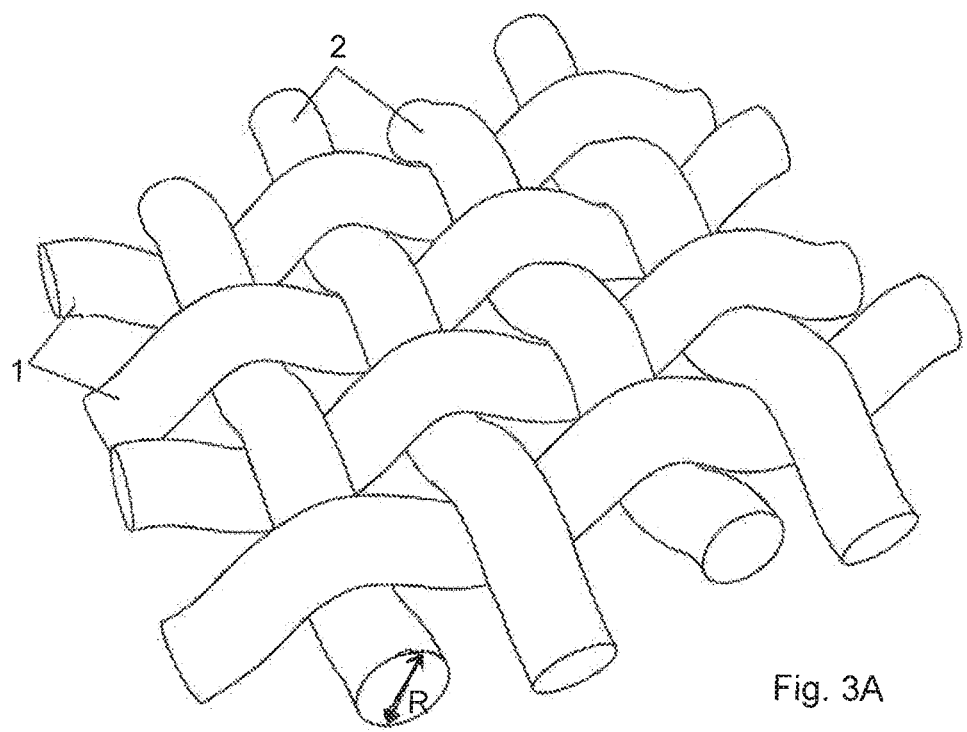
FIGS. 3A-3C shows the models of woven yarns used in the present invention: 3D volumetric yarns (FIG. 3A), interlaced rod segments with crimp (FIG. 3B), rod segments crossing at 5-DoF crossing nodes (FIG. 3C).
Figure 3B:
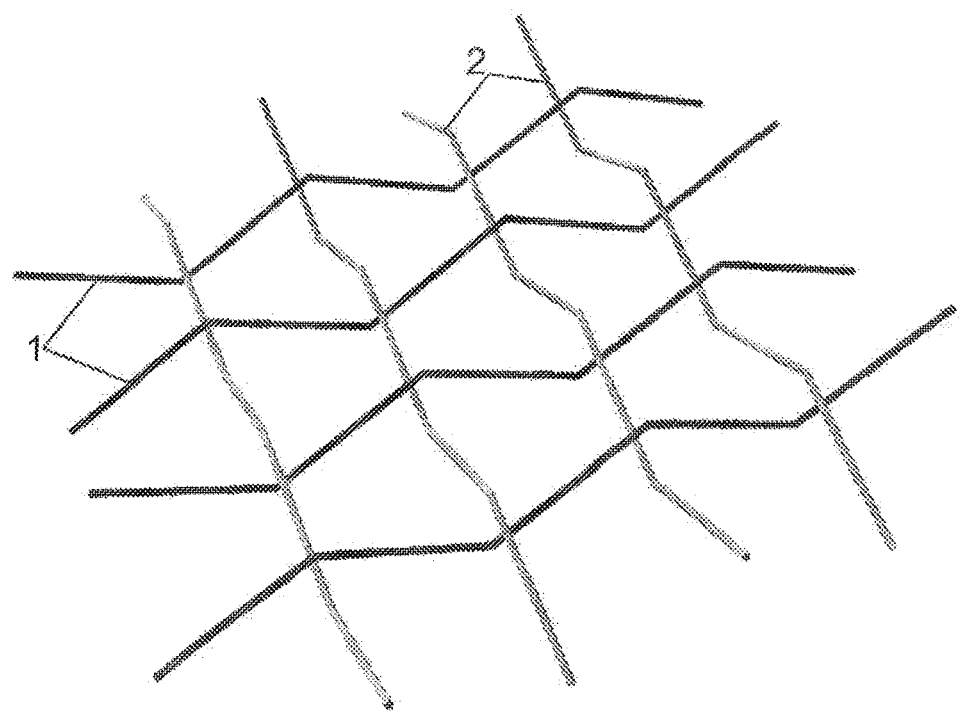
Figure 3C:
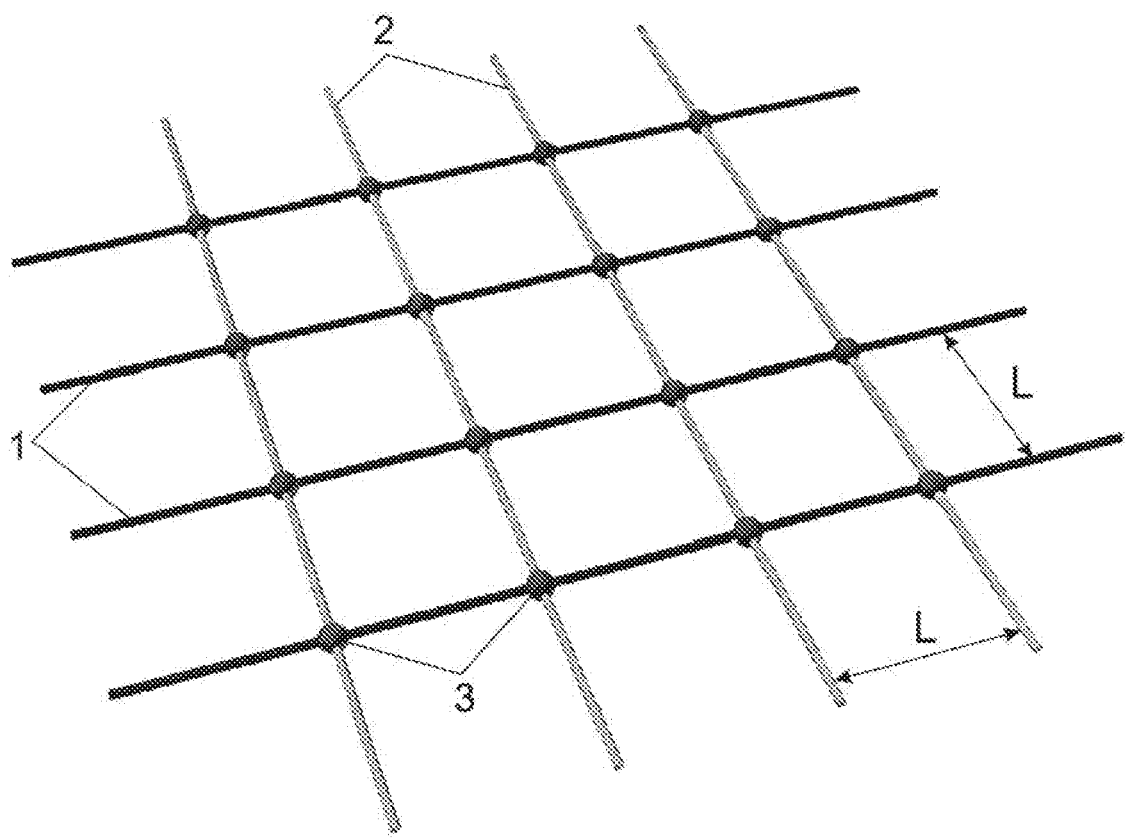

In the kinematic representation the volume of yarns is ignored and all yarns are initialized flat on the same plane. However, for the purpose of force computation and rendering the volume of yarns is accounted for. FIGS. 3A, 3B and 3C shows the models of woven yarns (warp yarns 1 and weft yarns 2) used in the present invention. Crimp is the bending introduced in warp 1 and/or weft 2 yarns to allow interlacing, as shown in FIG. 3A. Crimp also produces compressive forces between interlaced yarns, and this compression allows the existence of friction forces that hold the fabric together. In the present implementation, crimp is applied to both weft 2 and warp 1 yarns, offsetting them by the yarn radius R in opposite directions, as shown in FIG. 3B. The present implementation could be extended to allow for anisotropic crimp. The 3D volumetric yarns shown in FIG. 3A of a piece of fabric are replaced by interlaced rod segments with crimp (FIG. 3B) for normal force computation, and by rod segments crossing at 5 degrees of freedom (5-DoF) crossing nodes 3 (FIG. 3C) for everything else. The volumetric appearance is restored at rendering.

For ease of presentation, it is assumed that inter-yarn distance L and yarn radius R are the same for warp 1 and weft 2, but it is trivial to relax this assumption, and indeed the present implementation supports anisotropic cloth.

In woven cloth, the vast majority of yarns are in contact at yarn crossings, so that it can generally assumed that such contacts are maintained throughout the simulation. The motion of cloth could be described as a constrained dynamics problem, with a node-based discretization of yarns, plus a large number of contact constraints that maintain a zero-distance between yarns at yarn crossings. But it was observed that, instead of detecting and resolving such contacts, it is utterly more efficient to choose a convenient discretization based on yarn crossings.

Figure 4A:
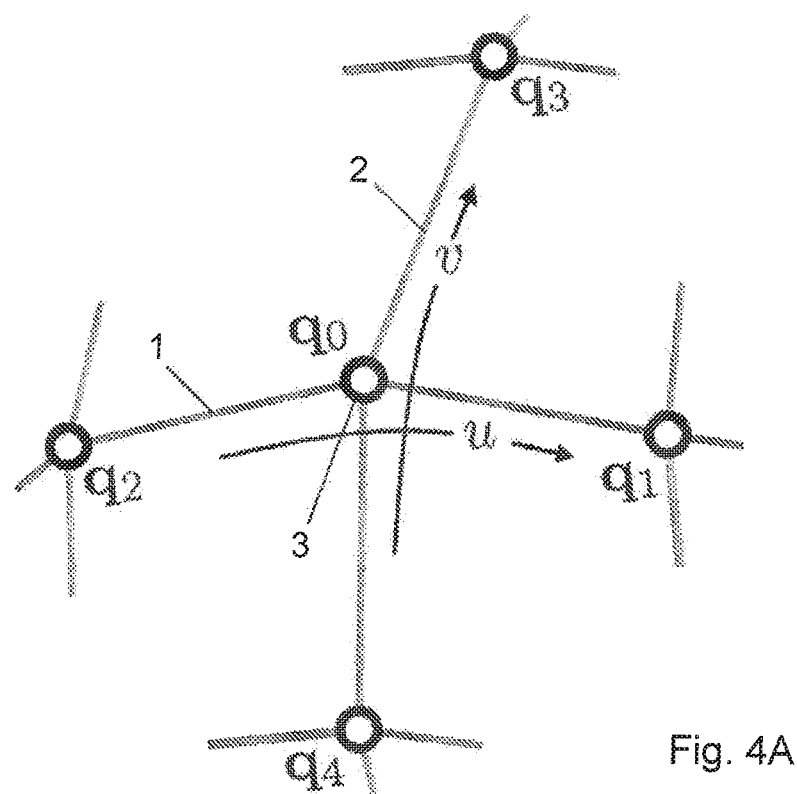
FIG. 4A shows warp and weft yarns crossing at node q0, and the four adjacent yarn crossings.

FIG. 4A shows warp 1 and weft 2 yarns crossing at node 50 $q_0$, and the four adjacent yarn crossings ($q_1, q_2, q_3, q_4$). Warp 1 and weft 2 yarns are parameterized based on their undeformed arc length, u and v respectively. Hence, u is the undeformed length of the warp yarn (1) between the crossing point (3) and one end point of the yarn; and v is the undeformed length of the weft yarn (2) between the crossing point (3) and one end point of the yarn. Then, a yarn crossing is described by its 3D position, x, and the parametric coordinates of the warp 1 and weft 2 material points at the yarn crossing. The variation of u and v coordinates models, respectively, the siding of warp and weft yarns. A yarn crossing is considered as a 5-DoF node with 3 Lagrangian DoFs and 2 Eulerian DoFs. We denote the ℜ the coordinates of the $i^{th}$ yarn crossing node as $q_i = (x_i, u_i, v_i)$.

It is herewith proposed to discretize woven cloth with a combination of 5-DoF yarn-crossing nodes and regular 3-DoE nodes. A 5-DoF node is set at each yarn crossing, and regular 3-DoF nodes at the end-points of yarns. FIG. 4A shows a regular set-up with a yarn crossing node 3 and its four adjacent nodes.

Given a warp segment [$q_0$, $q_1$] (and similarly for weft segments), positions are linearly interpolated according to the arc length u. Then, the 3D position of a point inside the segment is given by:

$$x(u) = \frac{u_1 - u}{\Delta u} x_0 + \frac{u - u_0}{\Delta u} x_1, \quad (1)$$

where $\Delta u = u_1 - u_0$ is the rest length of the segment.

The velocity of a point inside the segment depends on the velocities of yarn crossing points, but also on yarn sliding, and it follows by differentiating equation (1):

$$\dot{x}(u) = \frac{u_1 - u}{\Delta u}(\dot{x}_0 - \dot{u}_0 w) + \frac{u - u_0}{\Delta u}(\dot{x}_1 - \dot{u}_1 w), \quad (2)$$

where $w = \frac{x_1 - x_0}{\Delta u}$.

By concatenating the coordinates of all yarn crossing, a vector of generalized coordinates q is defined. The equations of motion can then be derived using the Lagrange-Euler equations [Goldstein et al. 2001] The kinetic energy is $T = \frac{1}{2}\dot{q}^T M \dot{q}$, with a generalized mass matrix M, V denotes the potential energy, and ∇ denotes the generalized gradient. Then, the Euler-Lagrange equations can be written as $$M\ddot{q} = \nabla T - \nabla V - \dot{M}\dot{q}. \quad (3)$$

It is assumed that mass is distributed uniformly along yarns, with density ρ. Then, following the equation (2) of velocity for an arbitrary point in a warp segment, the kinetic energy of the segment [$q_0$, $q_1$] (and similarly for a weft segment) is:

$$T_{0,1} = \frac{1}{2}(\dot{x}_0^T \; \dot{u}_0 \; \dot{x}_1^T \; \dot{u}_1) M_{0,1} \begin{pmatrix} \dot{x}_0 \\ \dot{u}_0 \\ \dot{x}_1 \\ \dot{u}_1 \end{pmatrix}, \quad (4)$$

with $$M_{0,1} = \frac{1}{6}\rho\Delta u \begin{pmatrix} 2I_3 & -2w & I_3 & -w \\ -2w^T & 2w^T w & -w^T & w^T w \\ I_3 & -w & 2I_3 & -2w \\ -w^T & w^T w & -2w^T & 2w^T w \end{pmatrix} \quad (5)$$

The potential energy V includes multiple terms, such as gravity and conservative internal forces. Gravity is defined, e.g., for the warp segment [$q_0$, $q_1$] as $$V_{0,1} = \rho\Delta u g^T \frac{x_0 + x_1}{2} \quad (6)$$

The formulation of internal forces is discussed now in detail. In addition to the conservative forces derived from energy potentials, it is also incorporated other force terms directly to the right-hand side of the Euler-Lagrange equations (3), such as friction and contact forces. It is also incorporated damping through the Rayleigh damping model which uses a damping-to-mass ratio and a damping-to-elasticity ratio as parameters, with mass and stiffness-proportional terms controlled by parameters α and β respectively.

For the force model it is considered two types of internal forces in woven cloth. The forces due to the deformation of individual yarns include stretch and bending forces. Yarn torsion is not considered, as its effect is minimal on cloth. Next, it will be described internal forces due to contact between interlaced yarns, which include normal compression sliding friction, shear, and contact between parallel yarns.

Conservative forces are described in a concise manner using energy potentials. In the general case, these potentials will produce forces on both the yarn crossing points and the sliding coordinates. In addition, the application of numerical integration requires the computation of force Jacobians, including mixed-terms relating crossing points and sliding coordinates.

To model stretch, the approach by Spillmann et al. [2007] is followed, defining a stretch energy that is quadratic in the strain along the yarn's centerline. With the present discretization, stretch strain is constant on each yarn segment. For the warp segment $[q_0, q_1]$, it is simply $\varepsilon = \|w\| - 1$. Then, the stretch energy of the segment for a stiffness $k_s$ can be computed as:

$$V_{0,1} = \tfrac{1}{2} k_s \Delta u (\|w\| - 1)^2 \qquad (7)$$

where $k_s = Y \pi R^2$, and Y is the elastic modulus. Yarns of woven cloth are often close to inextensible, which requires the use of a high elastic modulus. An alternative would be to enforce inextensibility through constraints and Lagrange multipliers. However, a solver for implicit integration has been designed for the present implementation, which will be later described in detail and which allows the efficient simulation of stiff yarns.

Figure 4B:
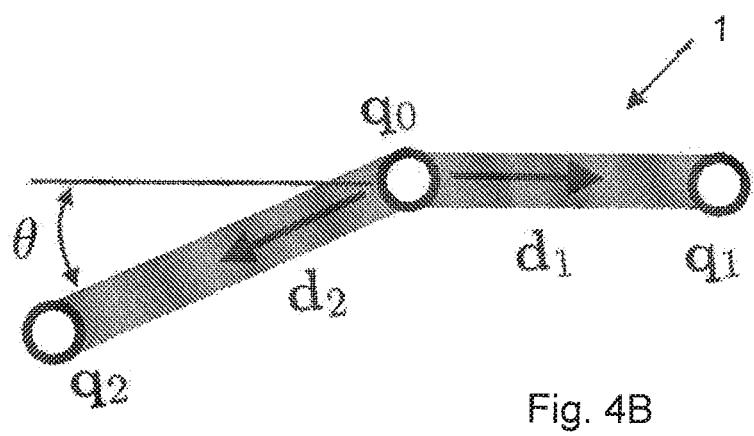
FIG. 4B shows the bending angle θ between two adjacent warp segments.

For model bending, a discrete differential geometry approach is taken, defining bending energies based on discrete curvatures at yarn crossings, separately for warp and weft yarns. There are several possible definitions of discrete curvature at yarn crossings [Sullivan 2008], but it is berewith defined it simply as the angle between yarn segments. This curvature is transformed into a curvature density dividing it by the arc length between segment centers. For the warp yarn 1 in FIG. 4B, given an angle θ between segments $[q_2, q_0]$ and $[q_0, q_1]$, curvature density at node $q_0$ is defined as $$k = \frac{2\theta}{u_1 - u_2}.$$

It is defined bending energy density with stiffness $k_b$ that is quadratic in curvature. Integrating it over the half-segments adjacent to $q_0$ results in a discrete bending energy $$V_{2,0,1} = k_b \frac{\theta^2}{u_1 - u_2}, \qquad (8)$$

where $k_b = B \pi R^2$, and B is the bending modulus. The expression could turn numerically unstable if yarn crossings became arbitrary close. However, this does not happen in practice due to the contact model between parallel yarns later described. Bergou et al. [2008]) choose a different discrete curvature metric, based on the tangent of the angle between segments. The resulting energy grows to infinity if a yarn bends completely, and this also creating excessive resistance to bending in practice. Yet another option is to use a discrete curvature metric based on the sine of the half-angle between segments, but this metric produces a non-convex bending energy.

Figure 4C:
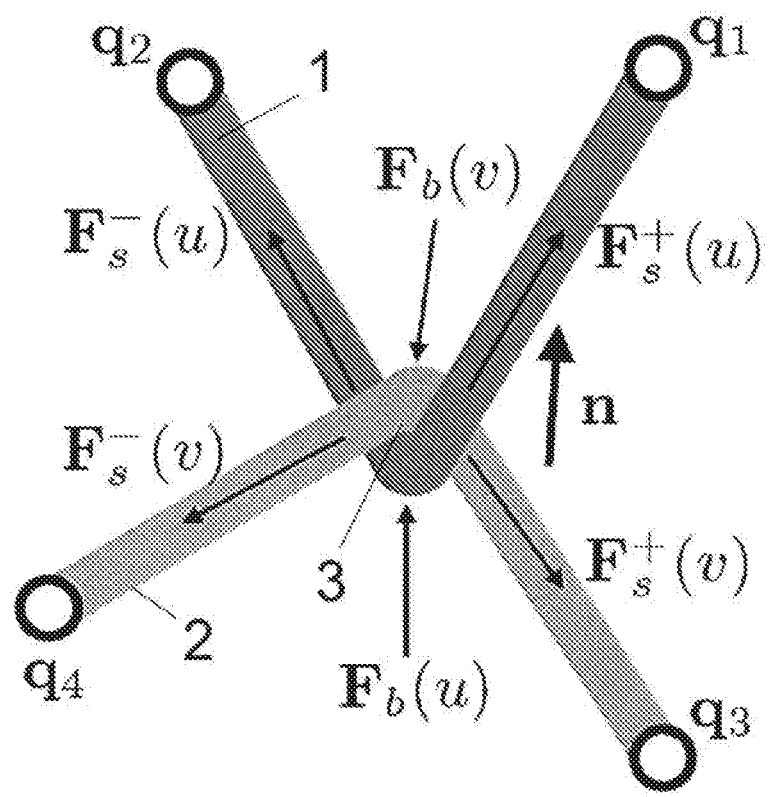
FIG. 4C represents the forces producing normal compression at a crossing node.

Woven cloth is held together by inter-yarn friction, and admissible friction forces are a function of inter-yarn normal compression at yarn crossings. The present yarn discretization ignores the relative motion between warp 1 and weft 2 yarns along their normal direction, hence normal compression cannot be modeled as an elastic potential. Instead, it is berewith proposed a quasi-static approximation that captures the desired friction effects. In essence, the compression force is estimated by averaging the normal components of warp and weft forces, depicted in FIG. 4C, and then this compression can be used to model friction and shear forces [Page and Wang 2000].

The detailed computation is as follows. At each yarn crossing 3, a best-fitting plane is computed using the positions of the node and its four adjacent nodes. As normal direction n is chosen the normal of the plane pointing from the warp yarn 1 toward the weft yarn 2. Crimp is applied by offsetting the positions of warp and waft points in the normal direction by the yarn radii (FIG. 3B), and bending forces are recomputed. At each yarn crossing, the compression force is estimated by summing the normal components of stretch $F_s$ and bending $F_b$ forces (in FIG. 4C superscripts + and − denote positive arid negative yarn directions), and averaging the resulting forces for warp and weft directions, i.e., $$F_n = \tfrac{1}{2} n^T (F_s(u) + F_b(U) - F_s(v) - F_b(v)) 0 \qquad (9)$$

If the compression force is negative, the yarns are considered to be separating, and the force is clamped to zero. It would be possible to extend this model to handle adhesion.

Note that we account only for stretch and bending forces. If the fabric is stretched, then compression is dominated by stretch. However, when it is not stretched, then it is dominated by bending. For a flat cloth, it is crucial to account for the misalignments produced by crimp, otherwise friction forces cannot hold the yarns in place, and this is why bending forces are recomputed after offsetting warp and weft points.

At each yarn crossing, friction forces that try to prevent sliding between warp 1 and weft 2 yarns are also computed. Inter-yarn friction is modeled using a penalty-based approximation of the Coulomb model, similar to the one of Vamane and Nakamura [2006]. The present discretization based on yarn crossings simplifies greatly the formulation of friction, and a simple spring on each sliding coordinate produces effective results.

Given the yarn crossing $q_0$, we set an anchor position $u_0$ on the warp yarn 1, and similarly for the weft yarn 2. The anchor position is initialized as the warp sliding $u_0$ at the crossing. Friction is modeled as a zero-rest-length viscoelastic spring between the anchor position and the actual warp coordinate.

The Coulomb model sets a limit $\mu F_n$ on the elastic component of the friction force, where μ is the sliding friction coefficient and $F_n$ is the inter-yarn compression as computed in equation (9) above. If the limit is not reached, the contact is in stick mode, and the force is defined by the spring. If the limit is exceeded, the contact is in slip mode, and the force is given by the Coulomb limit. In summary, the warp friction force is computed as:

$$F_{u_0} = \begin{cases} -k_f(u_0 - \bar{u}_0) - d_f \dot{u}_0, & \text{if stick} \\ -\text{sign}(u_0 - \bar{u}_0)\mu F_n - d_f \dot{u}_0, & \text{if slip.} \end{cases} \quad (11)$$

In addition, in slip mode the anchor position is maintained at a constant distance from the warp coordinate, such that the resulting spring force equals the Coulomb limit.

Figure 4D:
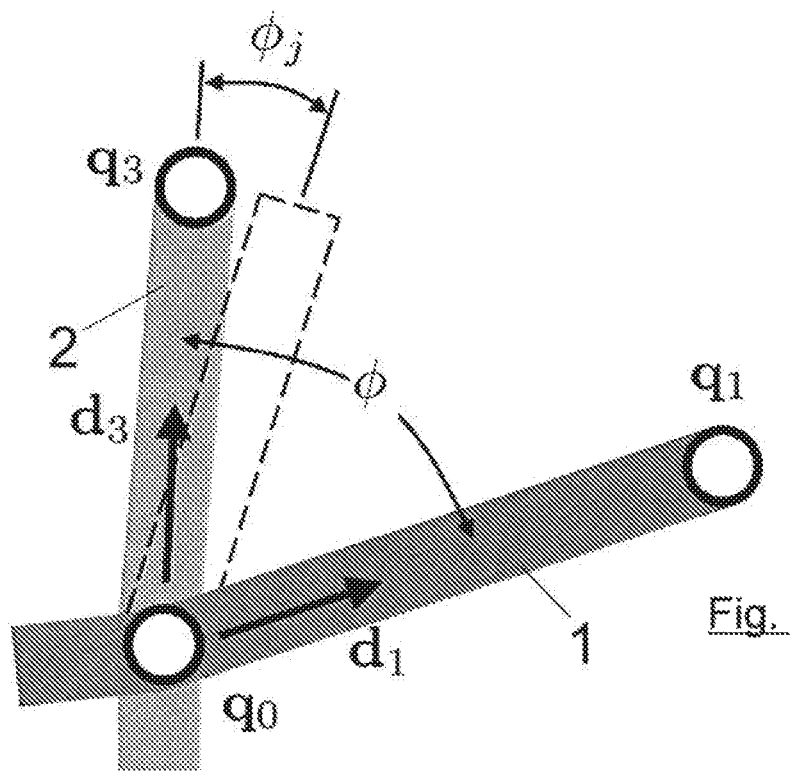
FIG. 4D represents the shear angle and shear jamming angle, between two adjacent warp and weft yarns.

At yarn crossings 3, adjacent warp 1 and weft 2 yarns rotate on top of each other as a function of the shear angle, as shown in FIG. 4D. This rotation produces two effects; yarn compression and contact friction. In addition, at interlaced crossings yarns suffer jamming as they collide.

To capture these effects, for every pair of warp and weft segments at a yarn crossing, an angular friction force and an elastic potential that depend on the shear angle are modeled. Let us consider, for example, the warp segment $[q_0, q_1]$ and the weft segment $[q_0, q_3]$ in FIG. 4D. A shear energy density given by the shear rotation $$\phi - \frac{\pi}{2}$$

is defined, integrating it over the two half-segments incident in $q_0$. In this integration, it was found that it is sufficient to use the default inter-yarn distance L. This approximation has little effect in practice and it eliminates the need to compute shear forces and their Jacobians for sliding coordinates. The resulting shear energy with stiffness $k_x$ is $$V_{0,1,3} = \frac{1}{2} k_x L \left( \phi - \frac{\pi}{2} \right)^2 \quad (11)$$

where $k_x SR^2$, and S is the contact shear modulus.

Normal compression increases the resistance to shear, and we model this effect by making the shear stiffness a function of the compression force, i.e., $k_x(F_n)$. Moreover, if either the warp or weft yarn segment is interlaced, shear jamming is also considered, modeled according to the following beuristics. We define the shear jamming angle $_j$ as the angle at which the end-points of the warp and weft segments with radius R touch each other, i.e., $$\phi_j = 2\arcsin\left(\frac{R}{L}\right).$$

We model jamming as a strong nonlinearity in the shear stiffness, leaving it as a constant for shear angles above the jamming angle, and making it grow cubically for smaller angles.

Shear friction can be modeled using an angular spring between the current shear angle and an anchor angle $\bar{\phi}$, following the same approach as for sliding friction previously described. We apply shear friction force only to the position of yarn crossing nodes, and it can be computed for each of the three nodes $q_1$ in the example in FIG. 4D as $$F_{x_i} = \begin{cases} -k_{f\phi}(\phi - \bar{\phi})\frac{\partial \phi}{\partial x_i}^T, & \text{if stick} \\ -\text{sign}(\phi - \bar{\phi})\mu_\phi F_n \frac{\partial \phi}{\partial x_i}^T, & \text{if slip} \end{cases} \quad (12)$$

Figure 5A:
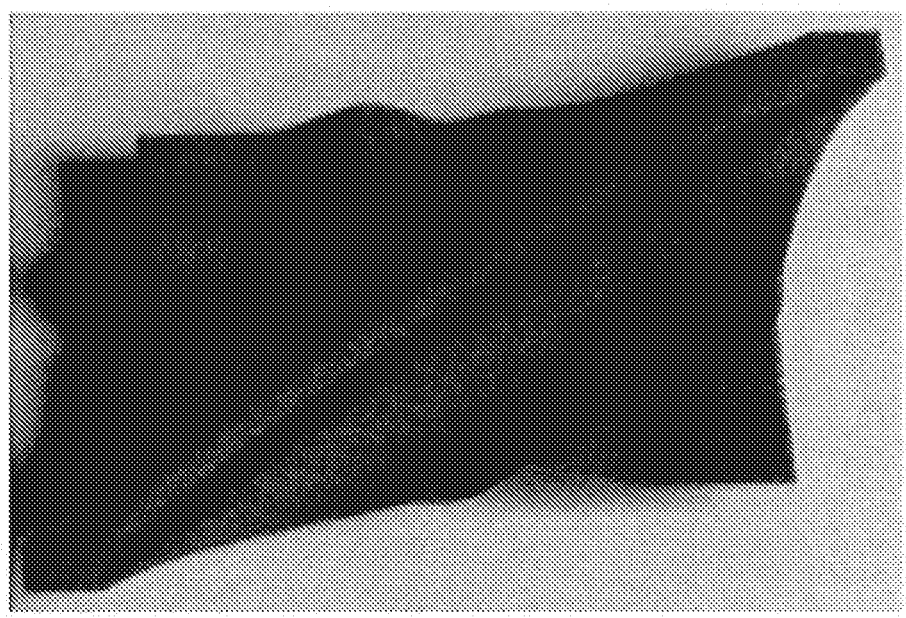
FIGS. 5A and 5B show shear friction effects, wherein the sample is stretched (FIG. 5A) and then relaxed (FIG. 5B), leaving a persistent wrinkle.
Figure 5B:

One of the visual effects of internal friction is the creation of persistent wrinkles, as demonstrated by Miguel and collaborators [2013]. FIG. 5A shows a small fabric sample that is first stretched and then relaxed (FIG. 5B), leaving a persistent wrinkle along the stretch direction due to shear friction.

Contact between adjacent parallel yarns can be easily modeled by adding a penalty energy if two yarn crossings get too close. We define the distance threshold d as four times the yarn radius if there is an interlaced yarn between the two crossings, and as twice the radius if the two yarns form a float. Given, for example, the weft yarns passing through $q_0$ and $q_1$ in FIG. 4A, we define an energy density based on the distance between crossing points, and integrate this density over the weft half-segments incident on both nodes. Assuming that yarns are practically inextensibie, the distance between crossing points can be approximated as the difference between warp sliding coordinates. And same as for shear, it was found that it was sufficient to integrate the energy density using the default inter-yarn distance L, thus eliminating the need to compute complex coupling forces with weft sliding coordinates. The resulting penalty energy with stiffness $k_c$ is:

$$V_{0,1} = \begin{cases} \frac{1}{2} k_c L (u_1 - u_0 < d)^2, & \text{if } u_1 - u_0 < d \\ 0, & \text{if } u_1 - u_0 \geq d \end{cases}.$$

Contact between interlaced yarns is handled implicitly by the present discretization, and contact between adjacent parallel yarns is easily handled as described above. On the other hand, contact with other objects as well as long-range self-collisions require explicit collision processing. Existing methods to detect and resolve collisions can be used. As a summary, a thin volume around the cloth is defined, which allows to compute penetration depth and implement collision response through penalty energies.

To detect contact with volumetric objects, distance fields are used. In the examples later commented, only rigid or articulated objects have been used, hence it was sufficient to compute the distance field once as preprocessing. Given an object O, at every time step we query every yarn node x against the distance field of O, and define a collision if the distance to O is smaller than γ (in the examples, γ is 4 times the yarn radius R). The collision information is formed by the crossing point x, the closest point p on the surface of O, and a contact normal n. The normal at p has been used as contact normal, although other options are possible.

To detect self-collisions, small volumetric elements on the surface of the cloth are defined, and the yarn nodes are queried against these volumetric elements following the approach of Teschner et al. [2003]. Two triangles are formed with the 4 nodes defined by every two pairs of adjacent warp and weft yarns, protruding the triangles by a distance γ in the directions of and opposite the normal at each crossing point to form each volumetric element (the estimation of normal was previously discussed). All nodes are queried against the protruded triangles, hashing AABBs of the protruded triangles on a regular grid for culling [Teschner et al. 2003]. If a point x is inside a protruded triangle, a collision is defined, finding the projected point p on the surface, and computing a contact normal n by interpolating the normals of the triangle's nodes.

For collision response, both with external objects or in self-collisions, a penalty force on the colliding point x is defined, with penalty distance $n^T(p-x)+\gamma$, and direction n. In the self-collision case, we also distribute the opposite force to the nodes that define the triangle, by using as weights the barycentric coordinates of p in the triangle. In addition to penalty response, Coulomb friction approximated through clamped springs is applied [Yamane and Nakamura 2006].

The obvious limitation of penalty-based response on thin objects is the chance of suffering pop-through problems. In the examples given below, pop-through was prevented by adding a damping term to the penalty response. A more robust solution would be to use a barrier method [Harmon et al. 2009].

The equations of motion (3) are integrated using backward Euler implicit integration [Baraff and Witkin 1998] with Newton's method and adaptive time stepping to ensure convergence. In practice, most solve steps require only one Newton iteration, and we allow up to five before having the time step. The simulation cost is dominated by the solution to linear systems of the type Av=b, where v=q̇ is the vector of generalized velocities, and the system matrix is defined as $$A = M - \Delta t \frac{\partial F}{\partial v} - \Delta t^2 \frac{\partial F}{\partial q}.$$

With the present discretization based on yarn crossings. A is formed by blocks of size 5×5.

The linear system is solved using the conjugate residual (CR) method. It is more robust than the conjugate gradient (CG) method for matrices that are close to semi-definite, as it computes the least-squares solution to the linear problem, at the expense of slightly higher cost and memory consumption.

An advantage of the present yarn-level cloth model is the strong regularity of the system matrix A, which allows a highly efficient implementation of numerical integration on GPUs, similar to GPU cloth solvers for regular triangle meshes [Tang et al. 2013]. The computation of internal forces, their Jacobians, and the solution to the linear system are parallelized on the GPU, but executing collision detection on the CPU. All in all, the bottleneck of the solver is the sparse matrix-vector multiplication needed on each iteration of PCR.

This product has therefore been optimized in multiple ways, exploiting the regularity of yarn-level cloth and our yarn-crossing discretization. Due to regularity of the weave pattern, the internal force of a node yields non-zero Jacobians w.r.t. 13 nodes (excluding collisions, each node interacts with 12 neighbors plus itself). Then, the system matrix A is split as the sum of a regular matrix A, and the remaining tail matrix $A_t$, where $A_r$ contains the 13 regular 5×5 blocks per node, and $A_t$ contains other blocks resulting from collisions. At amounts to only 14% of the product cost even with simple COO storage. The coefficients of $A_r$ are stored in a dense matrix in column-major order, with one row and 325=13×25 columns per node (2:53 KB per node in double precision). The indices of $A_r$ require a much smaller matrix, with one row and only 13 columns per node. Products involving $A_r$ are parallelized on a per-node basis, and column-major storage of the coefficients provides extremely efficient coalescent access to the data. The parallelization strategy mimics the one of the ELL and HYB matrix formats in the Cusp CUDA library [Bell and Garland 2012], but obtaining more than a 40% speed-up over Cusp in sparse matrix-vactor products thanks to node-level parallelization.

Overall, it is achieved a 16× to 24× speedup over a multithreaded CPU implementation, depending mainly on the number of nodes (higher speedup for a higher number of nodes) and the number of collisions (lower speedup for a higher number of collisions, since collisions are treated on the CPU).

For off-line rendering of the results, the yarn geometry is transformed into a volumetric representation at the microfiber level, and use the volumetric path tracer Mitsuba [Jakob 2010]. It accounts for the anisotropic scattering of microfibers using a microflakes model. For each yarn, a polyline with offsetted node positions is generated to account for crimp. The polyline yarns are smoothed using Catmull-Rom splines, and then a modified version of the Lumislice method is used [Chen et al. 2003; Lopez-Moreno et al. 2014] to define be volumetric representation of the yarn geometry to be passed to the Mitsube renderer. Each smoothed yarn is composed of thousands of twisted microfibers, and slices representing the microfiber density distribution are set perpendicularly along the thread segment at regular steps and incremental rotations. The density is computed by intersecting the absolute position of each texel at each site with a 3D texture volume. This is done in a fragment shader with asynchronous 3D texel store calls. The present implementation is based on OpenGL shaders and instanced geometry, and up to 8M slices are processed in less than 100 ms on a standard desktop machine. The tangents of microfibers are also stored in a 3D texture, computing differentials of texel positions at the current and previous slices, which differ mainly by the rotation along the yarn axis. Due to the asynchronous nature of texel calls in the shader, the previous slice is not accessible, hence the local differentials are precomputed and passed to each slice as a texture. All in all, the density and orientation of yarns at the microfiber level are stored in volumetric textures (3 GB per frame in the examples).

Visual and numerical large-scale examples for several woven cloth simulation scenarios are now described. All the examples were executed on a 3.4 GHz Quad-core Intel Core i7-3770 CPU with 32 GB of memory, with an NVIDIA Titan Black graphics card with 6 GB of memory. Collision detection is parallelized on the CPU, while the solution to dynamics is parallelized on the GPU as previously discussed. All the simulations were executed with a time step of 1 ms. The parameter values used in these examples are listed in FIG. 6. Representative timings are summarized in FIG. 7.

Figure 8:
FIG. 8 shows an example of loose tank top with 2023 yarns and 350530 crossing nodes, showing large motions as well as small scale folds and wrinkles.
Figure 8:
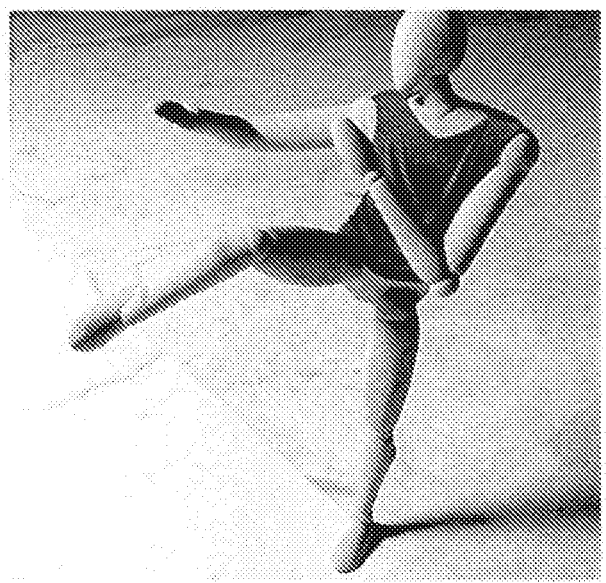
Figure 8:
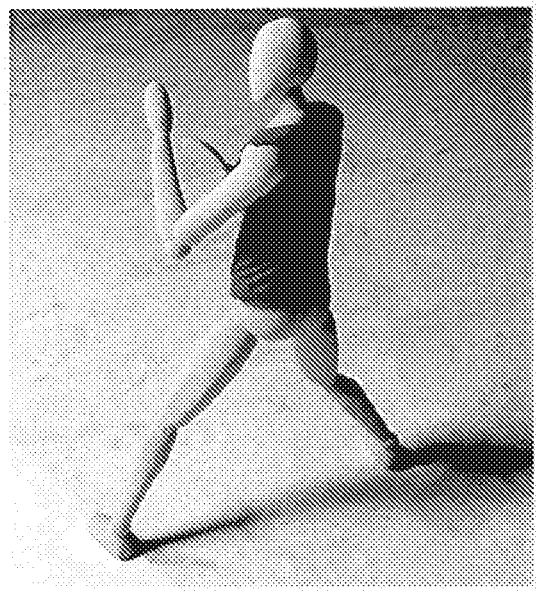

The examples are the following:

Loose tank top: A male mannequin was dressed with a loose tank top made of 2023 yarns and 350530 crossing nodes, one seam on each side and one seam on each shoulder (see FIG. 8). Yarn density is one yarn per millimeter (25 yarns per inch). The mannequin performs highly dynamic karate motions. The simulation shows large-scale motion and folds resolved at the yarn level, combined with fine-scale effects. Cloth dynamics and contact resolution are robust even under such challenging motions. Despite the highly dynamic motion of the mannequin, the simulation is robust.

Figure 9:
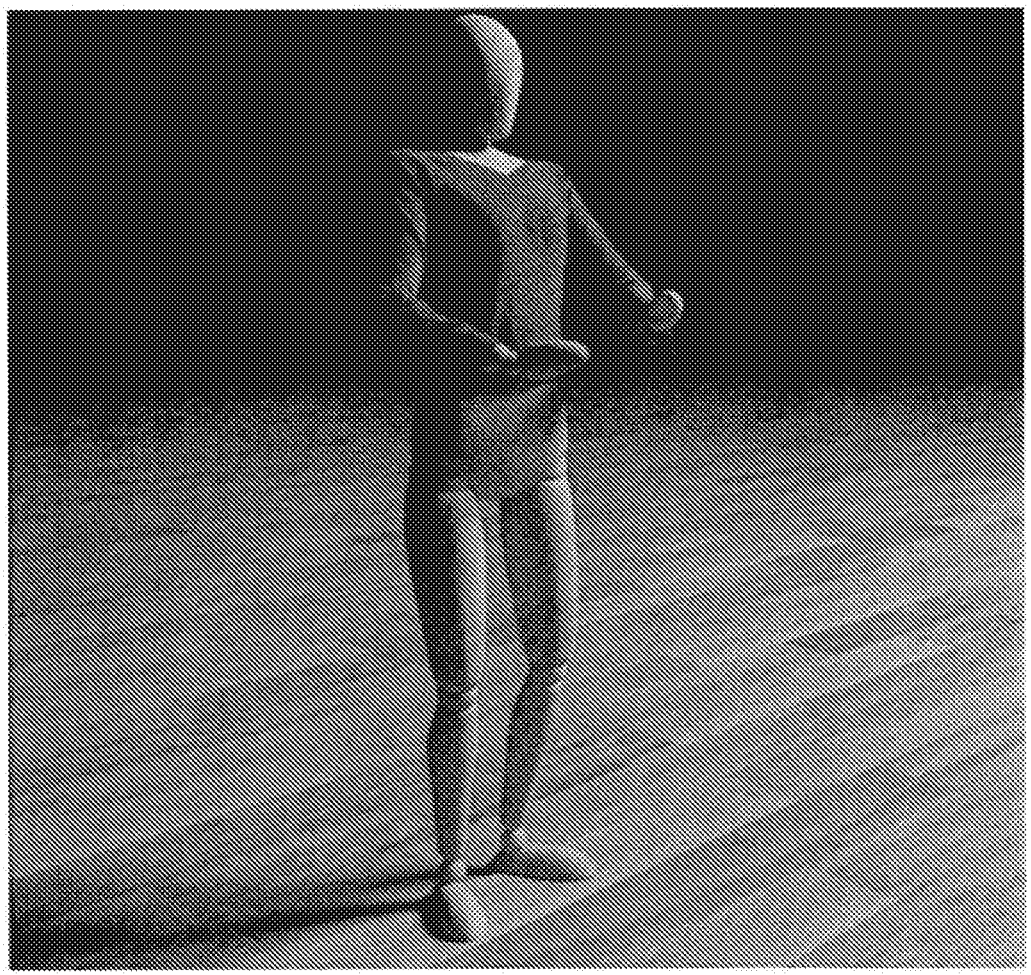
FIG. 9 shows an example of long shirt with 3198 yarns and 559241 crossing nodes.

Long shirt: A shirt with sleeves was designed to dress a dancing female mannequin (see FIG. 9). The shirt is made of 3199 yarns and 559241 crossing nodes, with seams on the sides of the body, the shoulders, the sleeve-body junctions and along the sleeves. Yarn density is one yarn per millimeter (25 yarns per inch). Compared to the loose tank top, this simulation shows a higher complexity due to a higher crossing node count and the additional dynamics and contact mechanics of the sleeves. Using a yarn-level model inherently produces high resolution cloth dynamics, as shown by the small-scale wrinkles throughout the sleeves.

Figure 10:
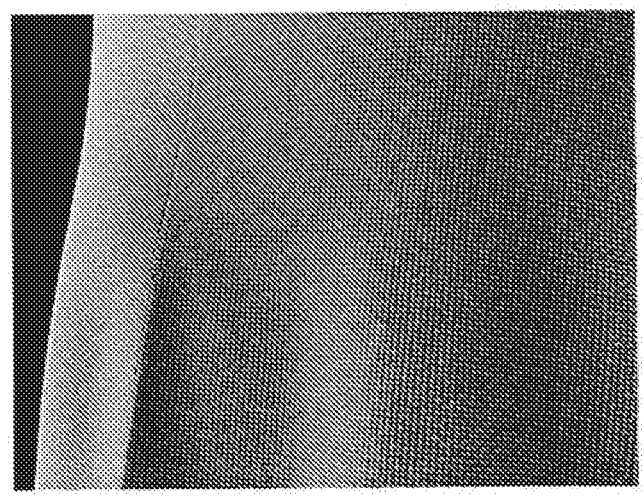
FIG. 10 shows an example of a yarn-level simulation of a snag produced on a shirt with 2023 yarns and 350530 crossing nodes, by pulling on a seam node.
Figure 10:
Figure 10:
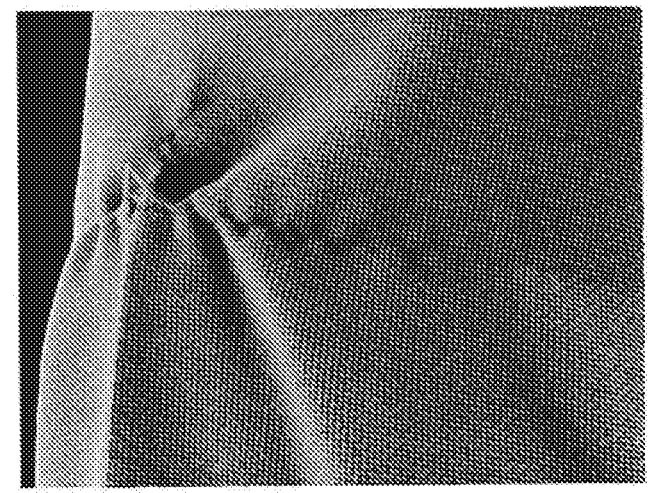

Snags: These examples show how extreme deformations of cloth produce highly complex plastic deformations at the yarn level, as well as the influence of local yarn dynamics on the global shape of the fabric. A snag in the loose tank top was produced, by pinching a node on the side seam and pulling it outwards very fast (see FIG. 10). The deformation due to pulling generates a small hole: the warp yarn being pulled pushes the weft yarns away, in a clear example of yarn sliding and yarn contact dynamics. In addition, the snag is transferred all across the shirt, showing fine wrinkles as the complex effect of yarn sliding and friction. Such a plastic effect can only be achieved by simulating fabric at the yarn level with yarn-yarn interaction. Fine-scale deformations showing yarn sliding and thin wrinkles are combined with large-scale motion of the shirt.

Figure 11A:
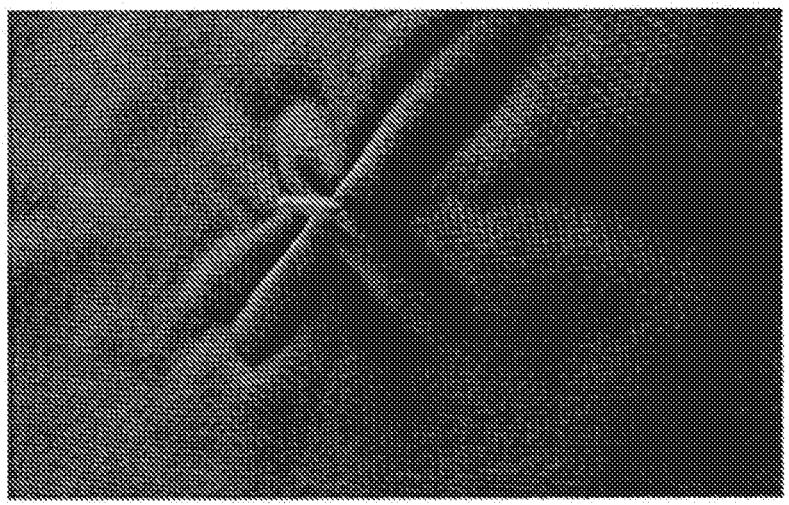
FIGS. 11A-11C shows an example of a snag produced in the belly area of the loose tank top of FIG. 8.
Figure 11B:
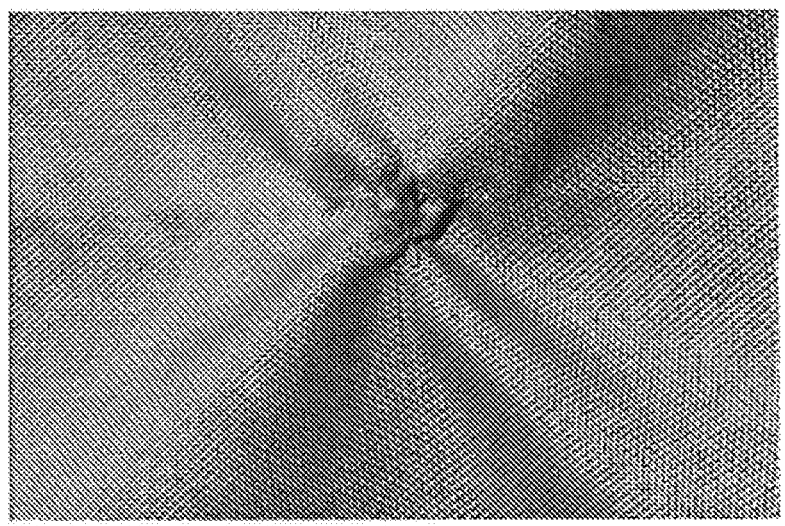
Figure 11C:
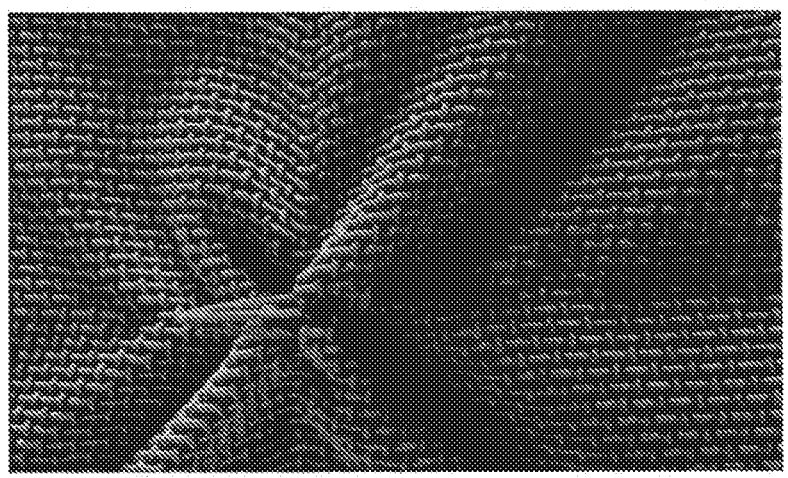

A second snag is produced in the belly area of the loose tank top by pulling a crossing node and fixing the four neighboring nodes that are not on the yarns being pulled (see FIGS. 11A, 11B and 11C). This setup tries to mimic the pulling of a yarn while locally blocking the outward motion of the fabric with the hand. The cloth wrinkles forming a cross shape, showing another familiar snagging pattern.

Tearing: Simulating the tearing of cloth using the yarn-level model is straightforward, as the complex and visually rich behavior of frayed edges and loose yarns come naturally with yarn-level dynamics. Fracture was implemented simply by splitting yarns when a threshold of stretch stress is exceeded, followed by a relaxation step to allow a correct stress relief and avoid erratic crack propagation. More sophisticated approaches could be used, such as separation tensors [O'Brien and Hodgins 1999] and local relaxation substeps [Pfaff et al. 2014]. Node resampling is frequently triggered during fracture and highly plastic behaviors due to yarn pullouts and sliding past the end of a yarn.

Figure 12:
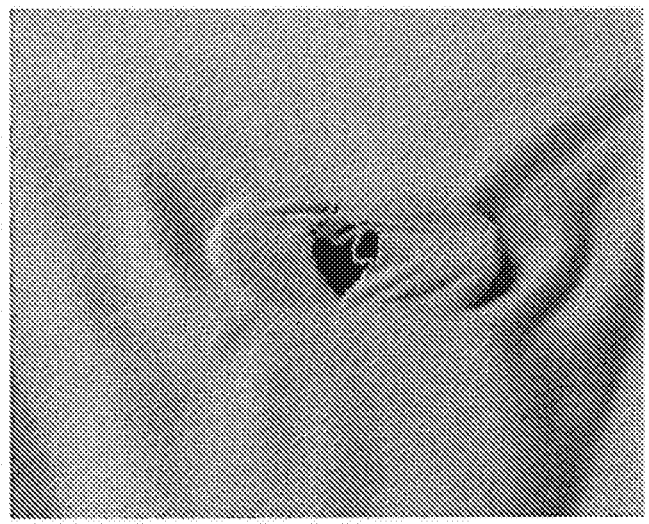
FIG. 12 shows the loose tank top of FIG. 8 torn open by grabbing some nodes and pulling them apart. Yarns are detached and edges are frayed in the process.
Figure 12:
Figure 12:

The loose tank top was torn by pinching two sets of crossing notes in the torso area and pulling them apart in opposite directions, creating a vertical fracture path and a diamond-shaped opening as shown in FIG. 12. Individual yarns detach from the edges of the crack, and either hang or stretch the edges across the opening. These loose yarns and the resulting frayed edges are commonly seen in the tearing of many types of fabric. More subtle plastic deformations can be observed around the crack, mainly due to yarn sliding.

Weaving patterns: The yarn-level model allows for easy configuration and simulation of different weave patterns. As previously mentioned, configuring the fabric for a specific weave pattern is just a matter of setting a flag for each node that specifies which yarn is on top. Weave patterns directly affect the global and local behavior of cloth, mainly due to the different number of floats. Shear, for instance, is greatly influenced by the number of crossings and floats in the fabric. The visual aspect of the cloth also changes according to the pattern.

Three 25×25 cm cloth sheets (see FIGS. 1A, 1B and 1C) were simulated by hanging them from two corners. Yarn density is one yarn per millimeter (25 yarns per inch). The three sheets are exactly the same except for the weaving pattern, where the first one is plain weave (FIG. 1A), the second one is twill (FIG. 1B) and the third one is satin (FIG. 1G). FIGS. 1A, 1B and 1C shows a still of each sheet after two seconds of simulation. The sheets exhibit clearly distinctive behaviors, from FIG. 1A to FIG. 1C the wrinkles move to the bottom, the bottom edge of the fabric falls lower, and the top edge shows higher curvature. These effects are due to lower shear stiffness for weaves with more floats, with is the expected result reality. Lower shear stiffness results in better drape quality. The visual appearance is also different between the three stills. In the top part of each sheet, the "see-through" effect due to stretch reveals the different weaving structures of the cloth. It can also be observed how the twill woven sample exhibits its characteristic diagonal pattern.

The three sheets are put through a shear frame test and measured the overall shear through time. Results are plotted in FIG. 2., showing force-angle plots for each weave pattern. The plots exhibit hysteresis due to friction and nonlinearity due to jamming as observed on real fabrics [Miguel et al. 2012], as well as the influence of the weave pattern. Again, weave patterns with more floats are less resistant to shear, as expected.

Figure 13A:
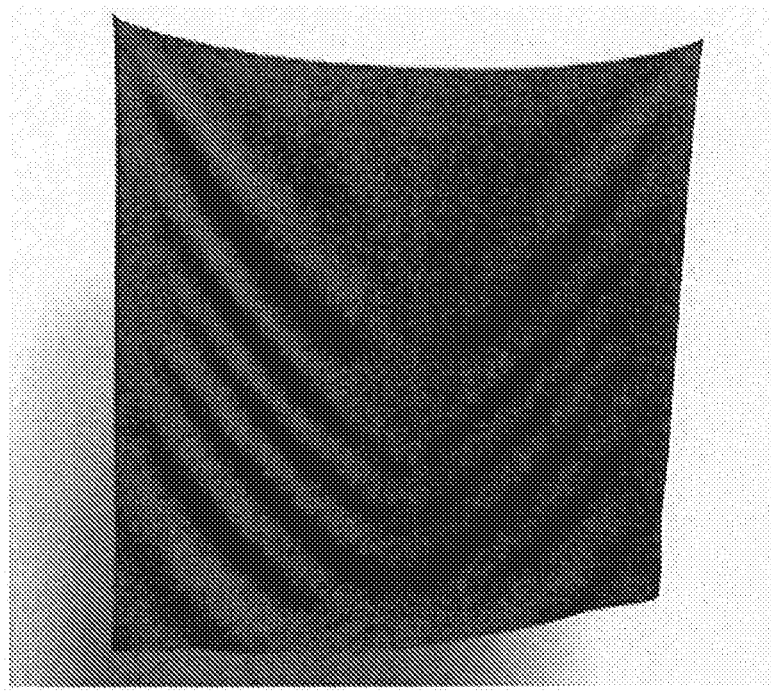
FIGS. 13A and 13B show a 100-yarn-per-inch plain-weave sheet (1 million crossing nodes). Small wrinkles appear during motion (FIG. 13A) until the sheet comes to rest exhibiting large draping wrinkles (FIG. 13B).
Figure 13B:
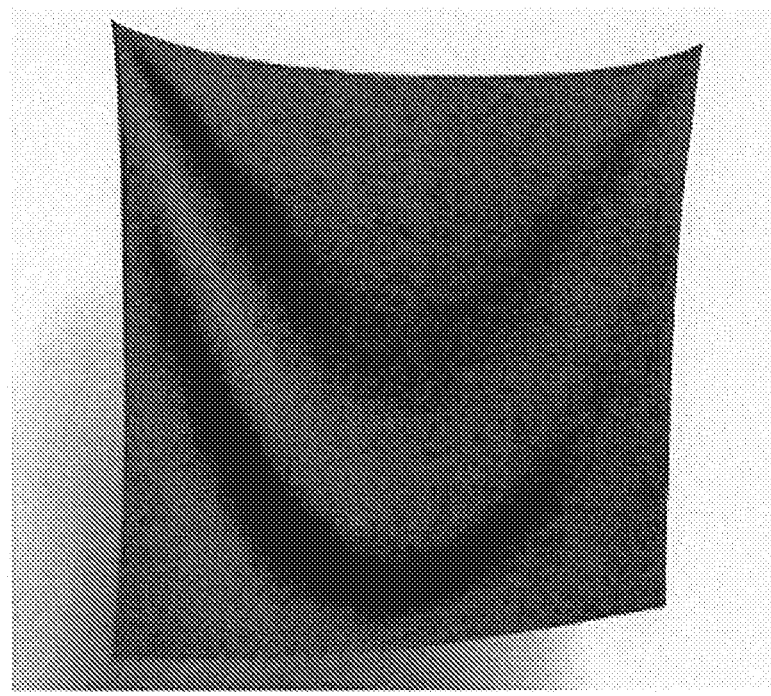

A fourth cloth sheet using plain weave was simulated, but this time with 4 yarns per millimeter (100 yarns per inch). Given the sheet's size, this yarn density translates into 1 million crossing nodes. This example, shown FIGS. 13A and 13B, shows how the model can handle very high yarn densities found in common woven fabrics such as bed linen. Small wrinkles appear during motion (FIG. 13A) until the sheet comes to rest exhibiting large draping wrinkles (FIG. 13B). As per textile nomenclature, 100 yarns per inch is equivalent to a thread count of 200 .

Hence, the present invention is an efficient method to simulate woven cloth at the yarn level. The key novelty is a discretization of yarn crossings that resolves yarn-yarn contact implicitly and represents inter-yarn sliding efficiently. Effects such as inter-yarn friction, shear, and contact are also captured with simple force models. This yarn level model enables the simulation of effects such as tearing with frayed edges, plasticity due to snags, or nonlinear behavior due to fine-scale friction.

One of the advantages of yarn-level models is the possibility to replicate with high fidelity the nonlinear mechanics of real cloth. This requires estimating the parameters of the model from force-deformation measurements of real cloth. The fitting results could be compared to those of nonlinear cloth models.

The model approximates the compression between crossing yarns as a function of stretch and bending forces. Another possibility would be to incorporate compression as an extra degree of freedom, and add a compression potential to the system energy. Stretch forces are currently modeled using a stretch potential, but another possibility would be to consider yarns to be inextensible, and account for the compression produced during stretch due to crimping.

Even though the examples are limited to orthogonal weave patterns, the discretization is general and could be applied to arbitrary settings with interlaced yarns. One simple extension would be to handle triaxial weaving.

The implementation makes use of penetration-depth queries and penalty-based collision response. To ensure robustness of contact handling, stiff penalty energies must be used and the amount of motion per time step must be limited. Robustness could be improved using continuous collision detection and constraint-based response, although contact handling might then become the bottleneck.

The invention claimed is:

1. A computer implemented method for simulating the behavior of a woven fabric at yarn level, the woven fabric associated with a computer model comprising a layout of warp yarns, weft yarns and yarn crossing nodes, the method comprising:
    describing each yarn crossing node of the computer model of the woven fabric by a 3D position coordinate and two sliding coordinates, including a warp sliding coordinate and a weft sliding coordinate respectively representing a sliding of warp and weft yarns of the woven fabric;
    determining forces on each yarn crossing node based on a force model, the forces being determined on both the 3D position coordinate and the sliding coordinates of yarn crossing nodes;
    calculating the movement of each yarn crossing node at a plurality of time steps; and
    rendering by transforming the computer model of the woven fabric into a computer graphic representation of the woven fabric in a plurality of frames to simulate a behavior of the woven fabric.

2. The computerimplemented method of claim 1, wherein the computer model of the woven fabric further includes at least one of: a 2D pattern of the woven fabric, including panels and seam locations; a layout of warp yarns, weft yarns and yarn crossing nodes for each panel; a weave pattern of the woven fabric for each panel; a yarn density and width for each yarn type used in the woven fabric; and a mechanical parameter for each yarn type used in the woven fabric.

3. The computerimplemented method of claim 2, wherein the mechanical parameter includes at least one of an elastic modulus, a bending modulus, a shear contact modulus, a sliding friction coefficient, a damping-to-mass ratio, and a damping-to-elasticity ratio.

4. The computerimplemented method of claim 1, wherein the computer model of the woven fabric includes a sliding-friction coefficient of the yarns, and wherein the force model includes sliding friction forces by using the slidingfriction coefficient and the sliding coordinates.

5. The computerimplemented method of claim 1, wherein the computer model of the woven fabric further comprises a stiffness of the yarns, and wherein the force model includes contact between adjacent parallel yarns by usingthe sliding coordinates, the stiffness of the yarns and an inter-yarn distance being obtained from the layout of the yarns.

6. The computerimplemented method of claim 1, wherein the computer model of the woven fabric further comprises an elastic modulus of the yarns, and wherein the force model includes stretch forces.

7. The computer implemented method of claim 1, wherein the computer model of the woven fabric further comprises a bending modulus of the yarns, and wherein the force model includes bending forces.

8. The computerimplemented method of claim 1, wherein the computer model of the woven fabric further comprises a shear contact modulus of the yarns, and wherein the force model includes shear forces.

9. The computer implemented method of claim 1, wherein the force model uses inter-yarn normal compression at yarn crossings using normal components of stretch and bending forces.

10. A computer-based system for simulatingthe behavior of a woven fabric at yarn level, the woven fabric associated with a computer model comprising a layout of warp yarns, weft yarns and yarn crossing nodes, the system comprising:
    a non-transitory computer readable media comprising computer program instructions that when executed:
    (a) determine forces on each yarn crossing node based on a force model, the yarn crossing nodes associated with a 3D position coordinate and two sliding coordinates, including a warp sliding coordinate and a weft sliding coordinate respectively representing a sliding of the warp and the weft yarns of the woven fabric, the forces being determined on both the 3D position coordinate and the sliding coordinates of yarn crossing nodes, and
    (b) calculate the movement of each yarn crossing node at a plurality of time steps;
    a plurality of GPUs communicatively coupled to the non-transitory computer readable media, each GPU comprising a plurality of nodes for executingthe instructions substantially in parallel; and
    a graphics data controller configured to receive output from the GPUs and to render by using the calculated movement of each yarn crossing into a computer graphic representation of the woven fabric in a plurality of frames, each frame corresponding to at least one of the plurality of time steps, to simulate a behaviorof the woven fabric.

11. The computer-based system of claim 10, wherein the computer model of the woven fabric further includes at least one of: a 2D pattern of the woven fabric, including panels and seam locations; a layout of warp yarns, weft yarns and yarn crossing nodes for each panel; a weave pattern of the woven fabric for each panel; yarn densities and widths for all yarn types used in the woven fabric; or mechanical parameters for all yarn types used in the woven fabric.

12. The computer-based system of claim 11, wherein the mechanical parameters include at least one of an elastic modulus, a bending modulus, a shear contact modulus, a sliding friction coefficient, a damping-to-mass ratio, or a damping-to-elasticity ratio.

13. The computer-based system of claim 10, wherein the computer model of the woven fabric includes a sliding friction coefficient of the yarns, and wherein the force model includes sliding friction forces by using the sliding friction coefficient and the sliding coordinates.

14. The computer-based system of claim 10, wherein the computer model of the woven fabric further comprises a stiffness of the yarns, and wherein the force model includes contact between adjacent parallel yarns by usingthe sliding coordinates, the stiffness of the yarns and an inter-yarn distance obtained from the layout of the yarns.

15. The computer-based system of claim 10, wherein the computer model of the woven fabric further comprises an elastic modulus of the yarns, and wherein the force model includes stretch forces.

16. The computer-based system of claim 10, wherein the computer model of the woven fabric further comprises a bending modulus of the yarns, and wherein the force model includes bending forces.

17. The computer-based system of claim 10, wherein the computer model of the woven fabric further comprises a shear contact modulus of the yarns, and wherein the force model includes shear forces.

18. The computer-based system of claim 10, wherein the force model uses inter-yarn normal compression at yarn crossings using normal components of stretch and bending forces.

19. A computer implemented method for displaying a simulation of a behavior of a woven fabric at yarn level, the method comprising:

receiving a plurality of frames comprising a simulation of a behavior of a woven fabric represented with a computer model comprising a layout of warp yarns, weft yarns and yarn crossing nodes, each frame of the plurality of frames rendering a yarn geometry at a time step, the yarn geometry based on a description of each yarn crossing node of the computer model of the woven fabric by a 3D position coordinate and two sliding coordinates, including a warp sliding coordinate and a weft sliding coordinate respectively representing a sliding of warp and weft yarns of the woven fabric, the yarn geometry further based on determining forces on each yarn crossing node based on a force model, the forces determined on both the 3D position coordinate and the sliding coordinates of yarn crossing nodes, and further based on a calculated movement of each yarn crossing node at the time step; and displayingthe plurality of frames.

20. The computer implemented method of claim 19, wherein the computer model of the woven fabric further includes at least one of: a 2D pattern of the woven fabric, including panels and seam locations; a layout of warp yarns, weft yarns and yarn crossing nodes for each panel; a weave pattern of the woven fabric for each panel; yarn densities and widths for all yarn types used in the woven fabric; or mechanical parameters for all yarn types used in the woven fabric.

21. The computer implemented method of claim 20, wherein the mechanical parameters include at least one of an elastic modulus, a bending modulus, a shear contact modulus, a sliding friction coefficient, a damping-to-mass ratio, or a damping-to-elasticity ratio.

22. The computer implemented method of claim 19, wherein the computer model of the woven fabric includes a sliding friction coefficient of the yarns, and wherein the force model includes sliding friction forces by using the sliding friction coefficient and the sliding coordinates.

23. The computer implemented method of claim 19, wherein the computer model of the woven fabric further comprises a stiffness of the yarns, and wherein the force model includes contact between adjacent parallel yarns by usingthe sliding coordinates, the stiffness of the yarns and an inter-yarn distance obtained from the layout of the yarns.

24. The computerimplemented method of claim 19, wherein the computer model of the woven fabric further comprises an elastic modulus of the yarns, and wherein the force model includes stretch forces.

25. The computerimplemented method of claim 19, wherein the computer model of the woven fabric further comprises a bending modulus of the yarns, and wherein the force model includes bending forces.

26. The computer implemented method of claim 19, wherein the computer model of the woven fabric further comprises a shear contact modulus of the yarns, and wherein the force model includes shear forces.

27. The computer implemented method of claim 19, wherein the force model uses inter-yarn normal compression at yarn crossings using normal components of stretch and bending forces.

28. The computer implemented method of claim 19, wherein the displaying the plurality of frames comprises displaying a human body shape wearing the woven fabric.

* * * * *